(12) United States Patent
Uejima et al.

(10) Patent No.: US 7,466,211 B2
(45) Date of Patent: Dec. 16, 2008

(54) HIGH-FREQUENCY SWITCHING MODULE AND FREQUENCY-CHARACTERISTIC ADJUSTING METHOD FOR HIGH-FREQUENCY CIRCUIT

(75) Inventors: Takanori Uejima, Moriyama (JP); Naoki Nakayama, Sakai (JP); Shinya Watanabe, Okayama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 14 days.

(21) Appl. No.: 11/838,000

(22) Filed: Aug. 13, 2007

(65) Prior Publication Data

US 2008/0258839 A1 Oct. 23, 2008

Related U.S. Application Data

(63) Continuation of application No. PCT/JP2006/308780, filed on Apr. 26, 2006.

(30) Foreign Application Priority Data

| Apr. 28, 2005 | (JP) | ............................. 2005-132920 |
| Apr. 28, 2005 | (JP) | ............................. 2005-132921 |
| Sep. 1, 2005 | (JP) | ............................. 2005-254196 |
| Sep. 1, 2005 | (JP) | ............................. 2005-254197 |

(51) Int. Cl.
*H01P 1/10* (2006.01)
*H01P 5/12* (2006.01)
*H01P 1/15* (2006.01)
*H03H 7/12* (2006.01)

(52) U.S. Cl. ..................... 333/101; 333/103; 333/176

(58) Field of Classification Search ................ 333/101, 333/103, 104, 176; 455/552.1, 83
See application file for complete search history.

(56) References Cited

U.S. PATENT DOCUMENTS

| 5,783,976 | A | 7/1998 | Furutani et al. |
| 5,990,732 | A | 11/1999 | Furutani et al. |
| 5,999,065 | A | 12/1999 | Furutani et al. |
| 6,600,385 | B2 | 7/2003 | Harada et al. |
| 6,633,748 | B1 | 10/2003 | Watanabe et al. |

(Continued)

FOREIGN PATENT DOCUMENTS

JP 09-200077 A 7/1997

(Continued)

OTHER PUBLICATIONS

Official Communication for PCT Application No. PCT/JP2006/308780; mailed on Aug. 1, 2006.
Official communication issued in counterpart Korean Application No. 10-2007-7018892, mailed on Sep. 11, 2008.

*Primary Examiner*—Dean O Takaoka
(74) *Attorney, Agent, or Firm*—Keating & Bennett, LLP

(57) ABSTRACT

A high-frequency switching module in which a high-frequency switch including a diode, which functions as a switching device, and a high-frequency filter including inductors and a capacitor are integrated with each other. The inductor defining a π-type high-frequency filter is connected directly and in series to the diode. By inserting the inductor, the cut-off frequency of a Chebyshev-type low-pass filter circuit produced when the diode is turned ON can be shifted to a lower frequency side, and also, the ripple can be suppressed to a small level.

16 Claims, 21 Drawing Sheets

U.S. PATENT DOCUMENTS

| | | |
|---|---|---|
| 6,983,129 B2 * | 1/2006 | Satoh et al. .................... 455/82 |
| 7,023,296 B2 * | 4/2006 | Uriu et al. .................... 333/132 |
| 7,075,386 B2 * | 7/2006 | Kearns ....................... 333/103 |
| 7,130,655 B2 * | 10/2006 | Kemmochi et al. ....... 455/552.1 |
| 7,200,365 B2 | 4/2007 | Watanabe et al. |
| 7,356,349 B2 * | 4/2008 | Furutani et al. .......... 455/552.1 |
| 7,398,059 B2 * | 7/2008 | Uejima et al. .................. 455/78 |
| 2004/0032706 A1 | 2/2004 | Kemmochi et al. |
| 2004/0087280 A1 | 5/2004 | Watanabe et al. |

FOREIGN PATENT DOCUMENTS

| | | |
|---|---|---|
| JP | 09-232887 A | 9/1997 |
| JP | 10-200302 A | 7/1998 |
| JP | 2000-201097 A | 7/2000 |
| JP | 2001-177434 A | 6/2001 |
| JP | 2003-133994 A | 5/2003 |
| JP | 2003-163606 A | 6/2003 |
| JP | 2004-112160 A | 4/2004 |
| JP | 2005-027287 A | 1/2005 |
| JP | 2005-64732 A | 3/2005 |
| JP | 2005-064779 A | 3/2005 |
| WO | 02/37709 A1 | 5/2002 |
| WO | 2005/046070 A1 | 5/2005 |

* cited by examiner

FIG.1
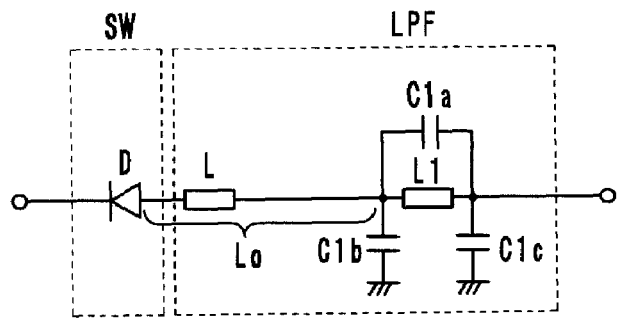
FIG.2A
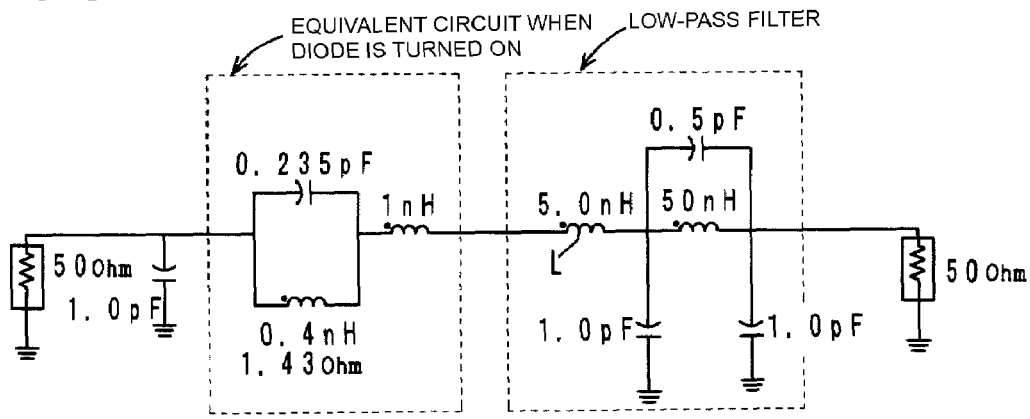
FIG.2B
FIG.3
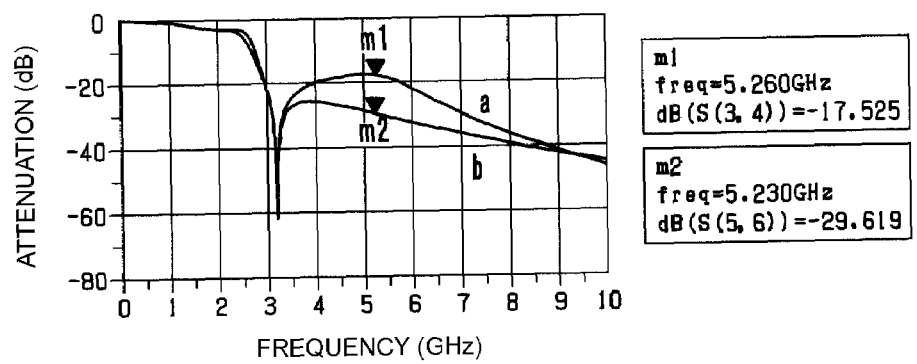

CHEBYSHEV-TYPE LOW-PASS FILTER

HIGH-FREQUENCY SWITCHING MODULE AND FREQUENCY-CHARACTERISTIC ADJUSTING METHOD FOR HIGH-FREQUENCY CIRCUIT

BACKGROUND OF THE INVENTION

1. Field of the Invention

The present invention relates to high-frequency switching modules, in particular, to a high-frequency switching module in which a high-frequency switch including a diode or an FET switch as a switching element and a high-frequency filter including inductors and a capacitor are integrated with each other. The present invention also relates to a frequency-characteristic adjusting method for a high-frequency circuit, in particular, to an adjusting method for attenuation characteristics in an RF front-end circuit including a high-frequency switch, such as a diode or an FET switch, as a switching element, and shunt-connected capacitors.

2. Description of the Related Art

In general, in a high-frequency switching module or an RF front-end circuit in a mobile communication apparatus, such as a cellular telephone, diodes are used as switching devices for switching between the transmission path for 1.8-GHz-band high-frequency signals and the transmission path for 900-MHz-band high-frequency signals.

The high-frequency switch of this type includes two diodes, inductors, capacitors, resistors, and other components, as disclosed in Patent Document 1 (Japanese Unexamined Patent Application Publication No. 2001-177434) or Patent Document 2 (Japanese Unexamined Patent Application Publication No. 2003-133994), and controls a voltage to be applied to a power supply terminal so that it can switch between the transmission and reception of signals. The high-frequency filter or the RF front-end circuit is defined by a π-type low-pass filter in which ground capacitors (shunt capacitors) are each disposed on either side of an LC parallel resonant circuit. The high-frequency filter or the RF front-end circuit is adapted to remove, in particular, high-order higher harmonics, such as second or third higher harmonics, generated in a low-noise amplifier (LNA) disposed in a transmission circuit.

In a high-frequency switch for switching between the signal transmission paths by switching ON/OFF a diode, it has been found that the diode D shown in FIG. 28A forms an equivalent circuit shown in FIG. 28B when it is forward-biased. That is, it has been found that, when the diode D is turned ON, a circuit in which a capacitor component C is connected in parallel to a resistor component R and an inductance component L connected in series to each other is formed.

In the equivalent circuit formed by connecting the above-described π-type low-pass filter to such a high-frequency switch, it has been found, as shown in FIG. 28C, that an inductance component L and a capacitor component C generated when the diode D is turned ON form a low-pass filter with a shunt capacitor C1 in the π-type low-pass filter. Additionally, since the inductance of the inductance component L in the equivalent circuit has a very small value (about 1 nH), this low-pass filter has a high cutoff frequency and thus exhibits a Chebyshev characteristic, i.e., the low-pass filter is a Chebyshev-type low-pass filter. The resistance component R may be zero.

If the frequency of a ripple (zero point in the pass band: fx) of the Chebyshev-type low-pass filter is in a high-order higher harmonic band, such as a second or third higher harmonic band, of a transmission signal, i.e., in a frequency band which is to be attenuated in the π-type low-pass filter, high-order higher harmonics, such as second or third higher harmonics, cannot be sufficiently attenuated. As a result, it may be difficult to obtain a high-frequency switching module or an RF front-end circuit exhibiting a desired frequency characteristic.

SUMMARY OF THE INVENTION

To overcome the problems described above, preferred embodiments of the present invention provide a high-frequency switching module exhibiting a desired frequency characteristic, and a frequency-characteristic adjusting method for a high-frequency circuit in which the cut-off frequency can be shifted to a lower frequency side and the ripple can be suppressed to a minimum level.

A first preferred embodiment is a high-frequency switching module in which a high-frequency switch including a high-frequency switching device for selectively switching between transmission paths for high-frequency signals and a π-type high-frequency filter including inductors and a capacitor to remove unwanted waves generated in the transmission paths are integrated with each other. The high-frequency switching module includes an inductor connected directly and in series between the π-type high-frequency filter and the high-frequency switching device, and a Chebyshev-type low-pass filter including an inductance component and a capacitor component formed when the high-frequency switching device is turned ON and a shunt capacitor included in the π-type high-frequency filter. When the frequency of a ripple, which is the zero point of a pass band, generated by the Chebyshev-type low-pass filter is indicated by fk, the frequency fk is in a frequency band other than n-order higher-harmonic attenuation bands, n being an integral multiple of a fundamental frequency and an integer of two or greater.

According to the first preferred embodiment, by connecting the inductor defining the π-type high-frequency filter directly and in series to the high-frequency switch, the frequency of the ripple (zero point of the bass band: fx) is not included in the attenuation band of the π-type low-pass filter. It is thus possible to obtain a high-frequency switching module exhibiting desired frequency characteristics with a simple configuration.

In the high-frequency switching module according to the first preferred embodiment, the frequency fk may preferably be positioned between a second higher-harmonic attenuation band and a third higher-harmonic attenuation band.

The high-frequency switch may selectively switch the transmission path for transmission signals and the transmission path for reception signals. The π-type high-frequency filter may be disposed on the transmission path for the transmission signals to remove high-order higher harmonics of the transmission signals.

The high-frequency switch may include a diode as the high-frequency switching device, and the inductor of the π-type high-frequency filter may be connected directly and in series to the diode. Alternatively, the high-frequency switch may include an FET switch as the high-frequency switching device, and the inductor of the π-type high-frequency filter may be connected directly and in series to the FET switch.

The π-type high-frequency filter may be disposed on the transmission path for high-frequency signals and may be a low-pass filter including a first inductor which is connected in parallel to a capacitor and which defines part of an LC parallel resonant circuit and a second inductor which does not have a capacitor connected in parallel to the second inductor and which is not included in the LC parallel resonant circuit. The second inductor which is not included in the LC parallel resonant circuit may be connected directly and in series to the high-frequency switch.

The inductor of the π-type high-frequency filter may preferably have an electric length at least about twice as long as the shortest electric length between one end of the high-frequency switch and another device connected to the one end of the high-frequency switch. As the inductance increases, the cut-off frequency can be shifted to a greater extent to the lower frequency side. Thus, the ripples can be more effectively suppressed.

The inductor of the π-type high-frequency filter may be built, as a stripline, in a module unit constructed by laminating a plurality of dielectric layers. Alternatively, the inductor of the π-type high-frequency filter may be built, as a chip component, in a module unit constructed by laminating a plurality of dielectric layers. If the inductor is formed as a stripline, the size of the module can be reduced. If the inductor is a chip component, an inductor having a large inductance can be easily obtained.

The high-frequency switching module according to the first preferred embodiment can be a single-band-compatible or multi-band-compatible switching module for selectively switching signal transmission paths for transmitting high-frequency signals having a single wavelength or for high-frequency signals having a plurality of different wavelengths. More specifically, the high-frequency switching module may be a single-band-compatible switching module for selectively switching signal transmission paths for transmitting high-frequency signals having a single wavelength, a dual-band-compatible switching module for selectively switching signal transmission paths for transmitting high-frequency signals having two different wavelengths, or a triple-band-compatible switching module for selectively switching signal transmission paths for transmitting high-frequency signals having three different wavelengths.

A second preferred embodiment is a frequency-characteristic adjusting method for a high-frequency circuit including a high-frequency switching device and a shunt capacitor which is shunt-connected at a stage before or after the high-frequency switching device. The frequency-characteristic adjusting method includes shifting a cut-off frequency of a Chebyshev-type low-pass filter circuit defined by an inductance component and a capacitance component of the capacitor produced when the high-frequency switching device is turned ON and the shunt capacitor to a lower frequency side and suppressing the frequency of a ripple, which is the zero point of a bass band, by adding an inductor directly and in series to the high-frequency switching device, and adjusting the value of the inductance so that, when the frequency of the ripple is indicated by fk, the frequency fk is in a frequency band other than n-order higher-harmonic attenuation bands, n being an integral multiple of a fundamental frequency and an integer of two or greater.

In the frequency-characteristic adjusting method for a high-frequency circuit according to the second preferred embodiment, by connecting the inductor directly and in series to the high-frequency switch, the cut-off frequency can be shifted to a lower frequency side by a desired amount and the ripple can be suppressed so that the frequency of the ripple (zero point of the bass band: fx) is not in the attenuation band of the π-type low-pass filter. In particular, by using the above-described RF front-end circuit, second or third higher harmonic waves can be attenuated.

In the frequency-characteristic adjusting method for a high-frequency circuit according to the second preferred embodiment, the frequency fk may preferably be positioned between a second higher-harmonic attenuation band and a third higher-harmonic attenuation band.

The inductor may preferably have an electric length at least about twice as long as the shortest electric length between one end of the high-frequency switching device and a device connected to the one end of the high-frequency switching device. As the inductance increases, the cut-off frequency can be shifted to a greater extent to the lower frequency side. Thus, the ripples can be suppressed more effectively. The device may be a capacitor which is shunt-connected at a stage before or after the high-frequency switching device.

The high-frequency switching device may be a diode or a FET switch, and the inductor may be connected directly and in series to the diode or the FET switch.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 1 is an equivalent circuit diagram illustrating the principle of preferred embodiments of the present invention.

FIGS. 2A and 2B show diagrams of equivalent circuits for simulating high-frequency circuits.

FIG. 3 is a graph illustrating high-frequency attenuation characteristics in the equivalent circuits shown in FIG. 2.

FIG. 28A is a switch circuit diagram; and FIGS. 28B and 28C are equivalent circuit diagrams.

DETAILED DESCRIPTION OF THE PREFERRED EMBODIMENTS

Figure 4A:
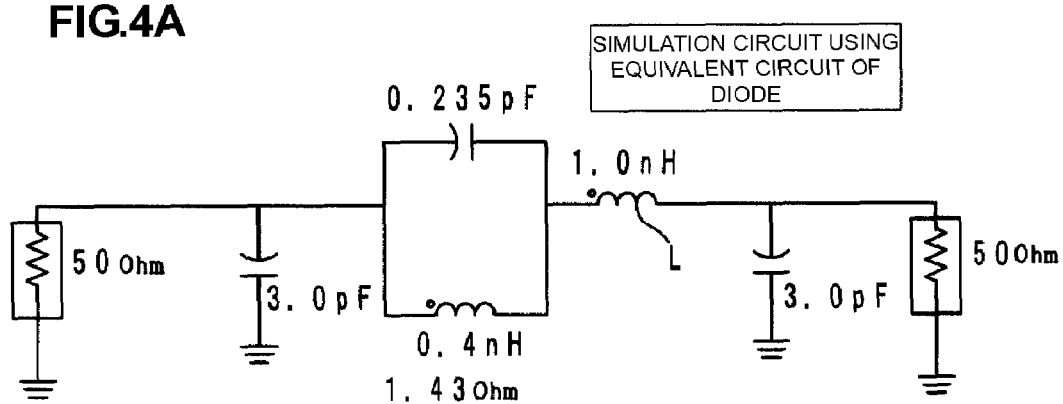
FIGS. 4A and 4B show diagrams of other equivalent circuits for simulating high-frequency circuits.

Preferred embodiments of high-frequency switching modules and frequency-characteristic adjusting methods for high-frequency circuits according to the present invention are described below with reference to the accompanying drawings.

Description of Principles of Preferred Embodiments of the Present Invention, See FIGS. 1 Through 12

The basic configuration of a high-frequency switching module according to preferred embodiments of the present invention is as follows, as shown in FIG. 1. An inductor L of a high-frequency filter is connected directly (not via another element) and in series to a diode D, which defines a switching device. More specifically, a high-frequency filter connected to the anode of the diode D, which defines a high-frequency switch SW, with an inductor L therebetween is a low-pass filter LPF. The low-pass filter LPF is defined by a circuit including an inductor L1 disposed on a signal line path, a capacitor C1a connected in parallel to the inductor L1, and shunt-connected capacitors C1b and C1c disposed at the stages before and after the inductor L1. The inductor L also defines part of the low-pass filter LPF.

FIG. 2A is an equivalent circuit for simulating a high-frequency circuit including a diode and a low-pass filter connected to each other. As an inductor L defining part of the low-pass filter, an inductor L having about 5.0 nH defining part of the low-pass filter is inserted into the stage after the diode. FIG. 2B is an equivalent circuit for comparison with the equivalent circuit shown in FIG. 2A in which an inductor L having about 5.0 nH defining part of the low-pass filter is disposed at the stage after the shunt capacitors forming the low-pass filter. The simulated equivalent circuits are circuits used for GSM1800 (center frequency: 1747.5 MHz).

The results obtained by simulating the high-frequency attenuation characteristics in both of the equivalent circuits are shown in FIG. 3. In contrast to an attenuation curve a obtained by the circuit in which the inductor L is not connected directly or in series to the diode, an attenuation curve b obtained by the circuit in which the 5.0 nH inductor L is inserted directly and in series to the diode shows that the ripple is significantly reduced, as indicated by m1 and m2. In other words, a sharp rise in the attenuation curve formed by the attenuation pole is suppressed to a small level, and a sufficient level of attenuation can be obtained in the corresponding band.

That is, in the case of the circuit shown in FIG. 2B, as indicated by the attenuation curve a, a sufficient level of attenuation cannot be obtained in the third higher harmonic band (about 5250 MHz), which is about three times as high as the fundamental wave (about 1747.5 MHz). In contrast, in the case of the circuit shown in FIG. 2A, a high level of attenuation can be obtained in the third higher harmonic band, which is about three times as high as the fundamental wave. In FIG. 3, the attenuation pole around about 3400 MHz is the attenuation pole provided by the LC parallel resonant circuit and corresponds to the second higher harmonic band, which is about twice as high as the fundamental wave. The attenuation poles of the curves a and b are substantially the same.

Figure 4B:
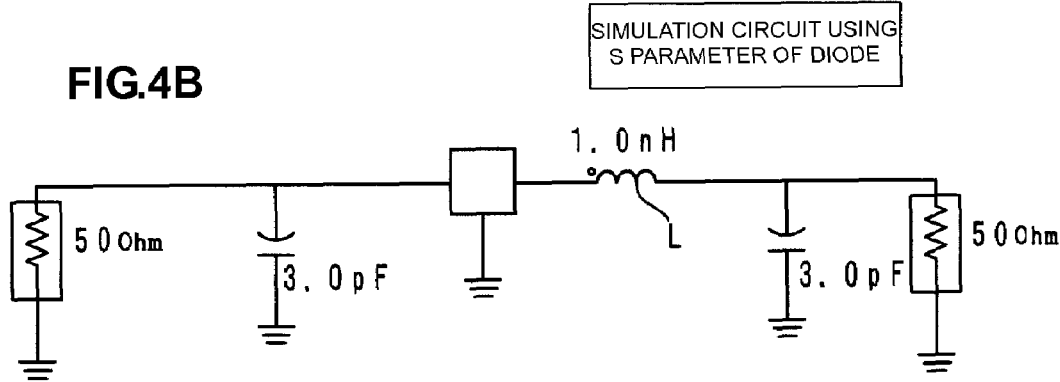
Figure 5:
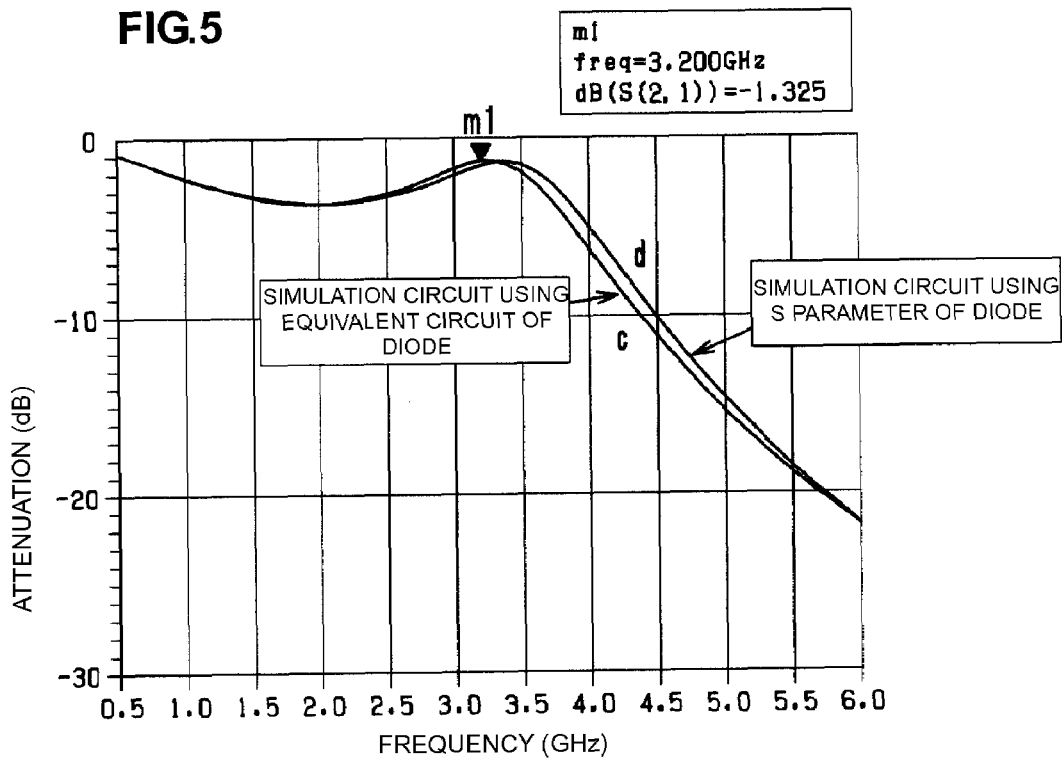
FIG. 5 is a graph illustrating high-frequency attenuation characteristics in the equivalent circuits shown in FIGS. 4A and 4B.

FIG. 4A illustrates a simulation circuit using an equivalent circuit of a diode, while FIG. 4B illustrates a simulation circuit using an S parameter of a diode, and a 1.0-nH inductor L is inserted in each of the circuits. The results obtained by simulating the high-frequency attenuation characteristics in the equivalent circuits are shown in FIG. 5. The attenuation curves c and d indicate the characteristics of the equivalent circuits shown in FIGS. 4A and 4B, respectively.

In the attenuation characteristics shown in FIG. 5, the inductance is as small as about 1.0 nH and is equivalent to the shortest electric length L0 between one end of the diode D shown in FIG. 1 and the device (shunt capacitor C1b) connected to that end of the diode D. In this manner, substantially the same attenuation characteristics can be exhibited by the simulation circuit using the equivalent circuit of the diode and by the simulation circuit using the S parameter of the diode.

Figure 6A:
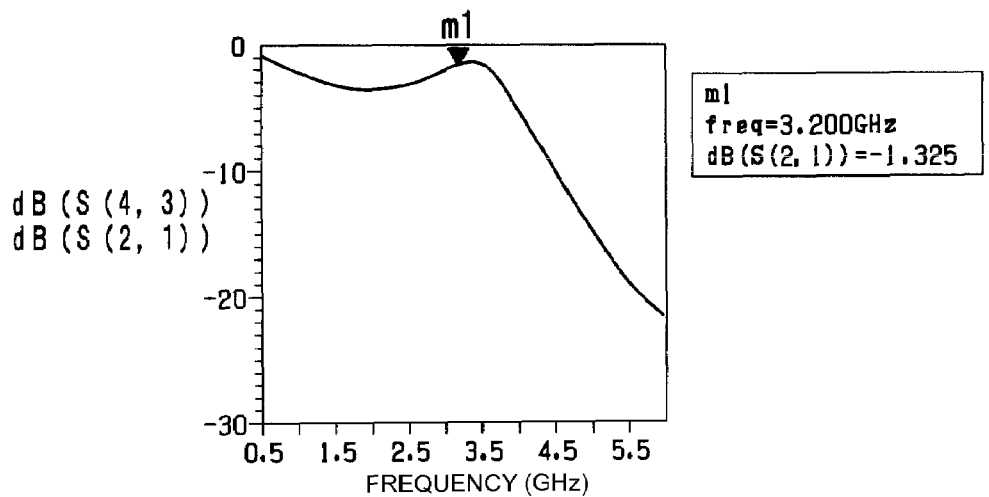
FIGS. 6A-6C show graphs illustrating high-frequency attenuation characteristics when the inductance of an inductor in the equivalent circuits shown in FIGS. 4A and 4B is changed.
Figure 6B:
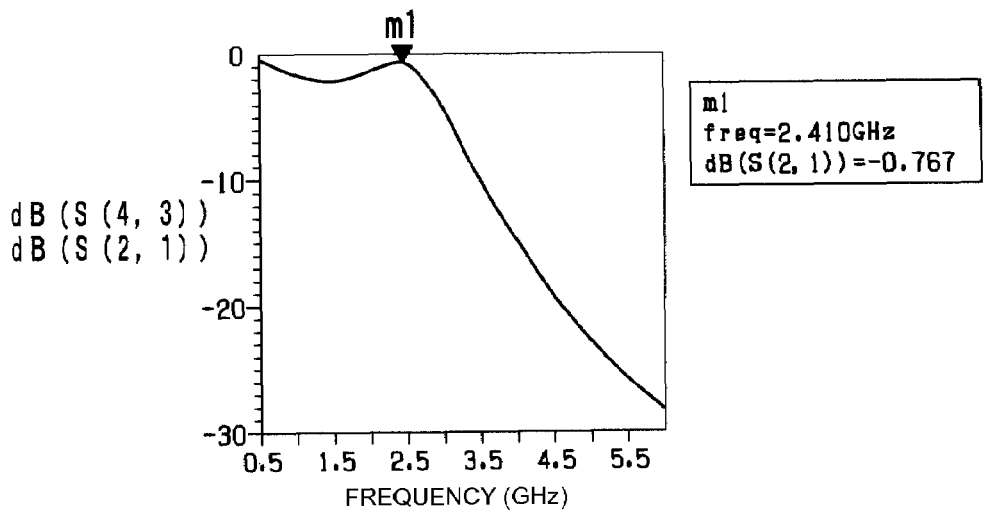
Figure 6C:
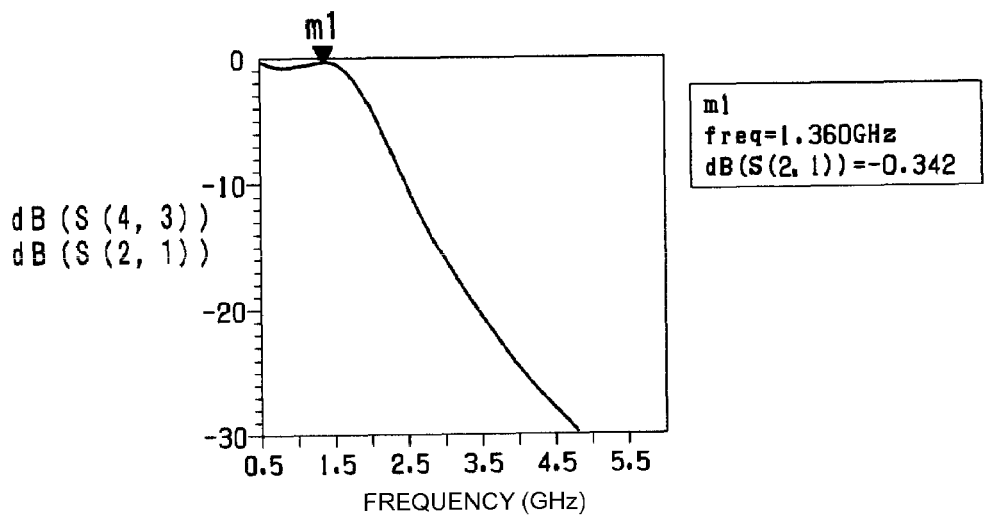

The attenuation curves when the inductance of the inductor L is changed to about 2.0 nH and about 5.0 nH are shown in FIGS. 6B and 6C, respectively. The attenuation curve when the inductance is about 1.0 nH (the same as that shown in FIG. 5) is shown in FIG. 6A for comparison.

By comparing FIGS. 6B and 6C with FIG. 6A, it can be clearly seen that the cut-off frequency is significantly shifted to the lower frequency side as the inductance of the inductor L is increased, such as to about 2.0 nH and about 5.0 nH, and the ripple are suppressed to a small level. This phenomenon occurs due to the following reason. In a Chebyshev-type low-pass filter defined by an inductance component and a capacitor component generated by turning ON a diode and a shunt capacitor disposed adjacent to the diode, by increasing the inductance of the inductor disposed between the diode and the shunt capacitor, the inductance of the Chebyshev-type low-pass filter is increased. That is, the inductor L functions as a "filter element" of a high-frequency filter and also functions as an "inductance adding element" for adding a new inductance component to the inductance component generated when the diode is turned ON.

In this manner, by moving the position of the inductor, which defines the high-frequency filter, to the position at which the inductor is connected directly and in series to the diode, the cut-off frequency in the Chebyshev-type low-pass filter can be shifted to the lower frequency side, and also, the ripple can be suppressed to a small level without changing the number of devices defining the high-frequency switching module. That is, the Chebyshev-type low-pass filter can exhibit characteristics similar to those of a Butterworth-type low-pass filter so that a high-frequency switching module exhibiting a desired attenuation characteristic is provided. That is, the ripple (sharp rise from the attenuation pole) occurring in a filter can be shifted so that they can be displaced from the band in which attenuation is to be obtained. In particular, a high-frequency switching module that sufficiently suppresses high-order higher harmonics can be provided.

The inductance added to the diode D corresponds to the electric length between the diode D and the shunt capacitor, which is a device adjacent to the diode D, of the low-pass filter. In this sense, in the high-frequency switch circuit (RF front-end circuit), in order to significantly shift the cut-off frequency to the lower frequency side and to suppress the ripple to a small level, it is preferable that the inductance of the inductor L is equivalent to the electric length at least approximately twice as long as the shortest electric length L0 between one end of the diode D and the device connected to that end of the diode D.

Figure 7:
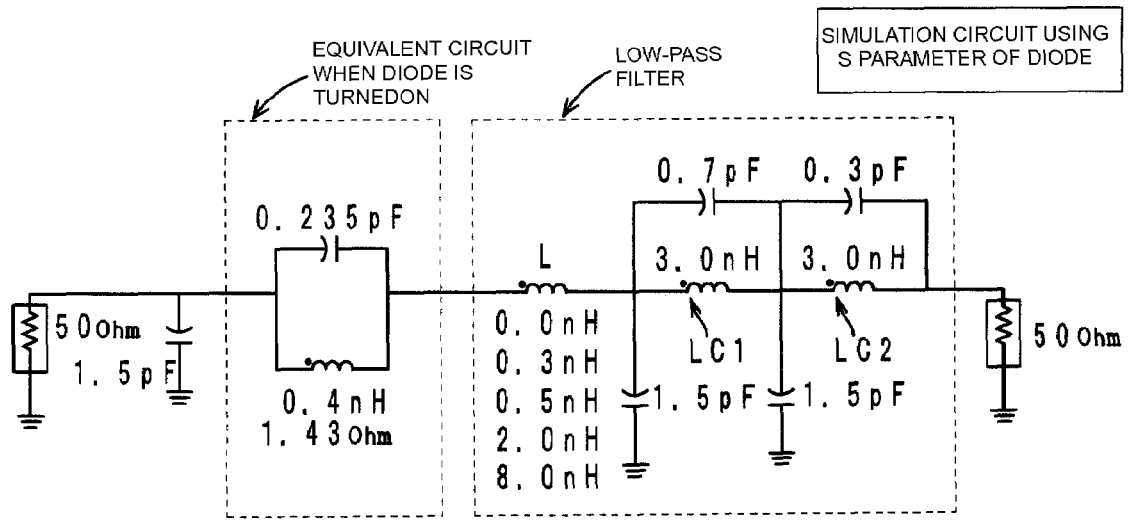
FIG. 7 is a diagram illustrating another equivalent circuit for simulating a high-frequency circuit.

FIG. 7 is another equivalent circuit to illustrate the principle of preferred embodiments of the present invention. This equivalent circuit is a simulation circuit using an S parameter of a diode. The low-pass filter includes an LC parallel resonant circuit LC1 for attenuating the second higher harmonics and an LC parallel resonant circuit LC2 for attenuating the third higher harmonics. The fundamental wave and the bandwidth of this simulation are about 1.81 GHz and about 0.2 GHz, respectively.

FIGS. 8 through 12 illustrate frequency characteristics when the inductances of the inductor L are set to be about 0.0 nH (FIG. 8), about 0.3 nH (FIG. 9), about 0.5 nH (FIG. 10), about 2.0 nH (FIG. 11), and about 8.0 nH (FIG. 12), respectively, in the simulation circuit shown in FIG. 7. In FIGS. 8 through 12, m1 and m2 indicate second higher-harmonic attenuation bands, and m3 and m4 represent third higher-harmonic attenuation bands. The broken lines designate the frequency characteristics of a Chebyshev-type low-pass filter, and the solid lines indicate the combined frequency characteristics of a Chebyshev-type low-pass filter and a π-type low-pass filter for attenuating second and third higher harmonics.

Figure 8:
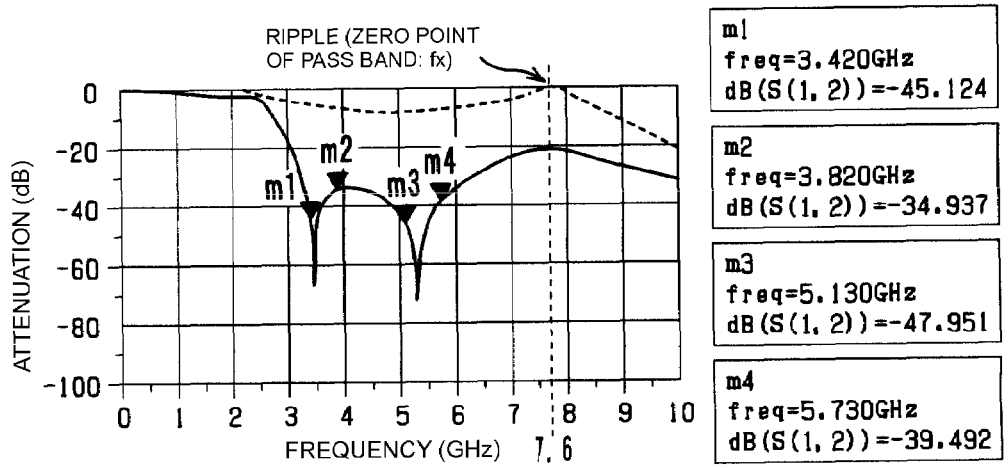
FIG. 8 is a graph illustrating high-frequency attenuation characteristics (inductance about 0.0 nH) in the equivalent circuit shown in FIG. 7.
Figure 9:
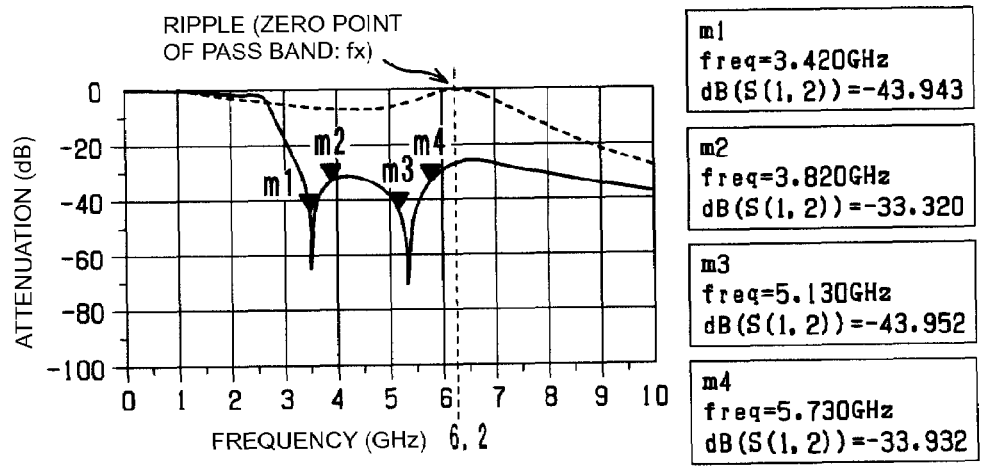
FIG. 9 is a graph illustrating high-frequency attenuation characteristics (inductance about 0.3 nH) in the equivalent circuit shown in FIG. 7.

FIG. 8 shows that, according to the frequency characteristic when the inductance of the inductor L is about 0.0 nH, since the ripple frequency (zero point of the pass band: fx) on the broken line is in the fourth higher harmonics, a sharp rise from the attenuation pole occurs around 7.6 GHz of the fourth higher harmonic band. This causes an insufficient level of attenuation. On the other hand, FIG. 9 shows that, by increasing the inductance of the inductor L to about 0.3 nH, the ripple frequency on the broken line is positioned around 6.2 GHz, which is higher than the third higher harmonic band and lower than the fourth higher harmonic band. Upon comparison between the frequency characteristics shown in FIGS. 8 and 9, changing the inductance of the inductor L from about 0.0 nH to about 0.3 nH decreases the ripple frequency.

Figure 10:
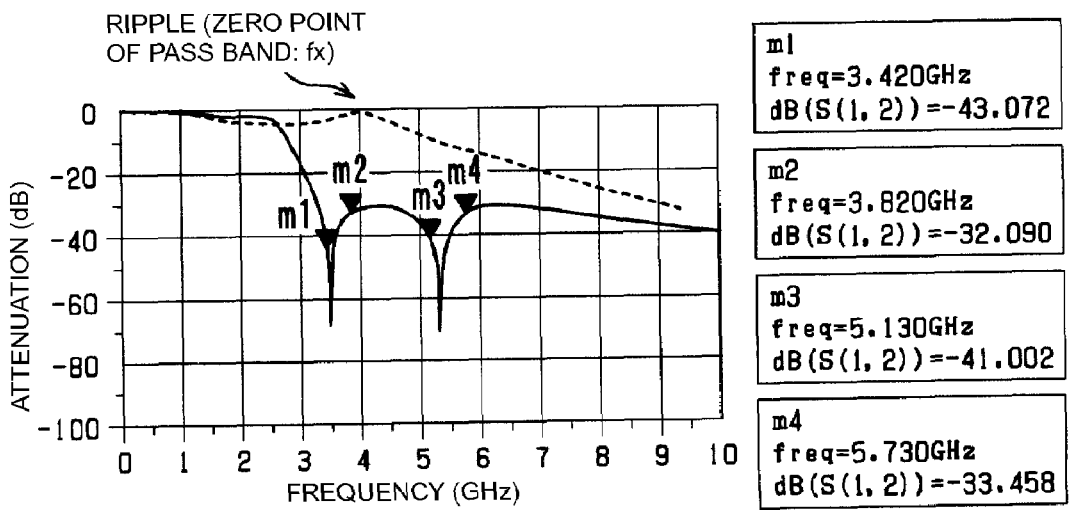
FIG. 10 is a graph illustrating high-frequency attenuation characteristics (inductance about 0.5 nH) in the equivalent circuit shown in FIG. 7.

FIG. 10 shows that, by further increasing the inductance of the inductor L to about 0.5 nH, the ripple frequency on the broken line is positioned between the second higher harmonic band and the third higher harmonic band. Accordingly, it is possible to prevent an insufficient level of attenuation generated at a frequency side higher than the third higher harmonic band.

Figure 11:
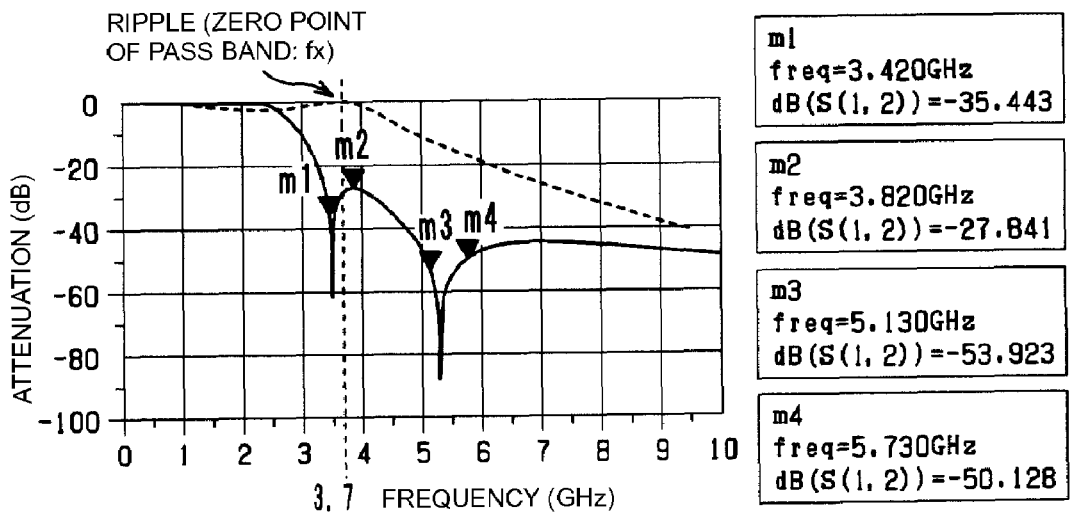
FIG. 11 is a graph illustrating high-frequency attenuation characteristics (inductance about 2.0 nH) in the equivalent circuit shown in FIG. 7.

FIG. 11 shows that, by further increasing the inductance of the inductor L to about 2.0 nH, the ripple frequency on the broken line is generated around 3.7 GHz between the second higher harmonic band and the third higher harmonic band and toward the second higher harmonic band. Accordingly, a higher level of attenuation is obtained in the third higher harmonic band. Upon comparison between the frequency characteristics shown in FIGS. 10 and 11, it can be seen that the attenuation obtained at a sharp rise from the attenuation pole generated between the third higher harmonic band and the fourth higher harmonic band is about −30 dB when the inductance is about 0.5 nH (see FIG. 10) and is about −45 dB when the inductance is about 2.0 nH (see FIG. 11). That is, a higher level of attenuation is obtained in the example shown in FIG. 11.

In the example shown in FIG. 11, by utilizing the attenuation band (higher than the ripple frequency) of the Chebyshev-type low-pass filter, it is possible to omit an LC parallel resonant circuit (indicated by LC2 in FIG. 7) for attenuating third higher harmonics. The same applies to the example shown in FIG. 12.

Figure 12:
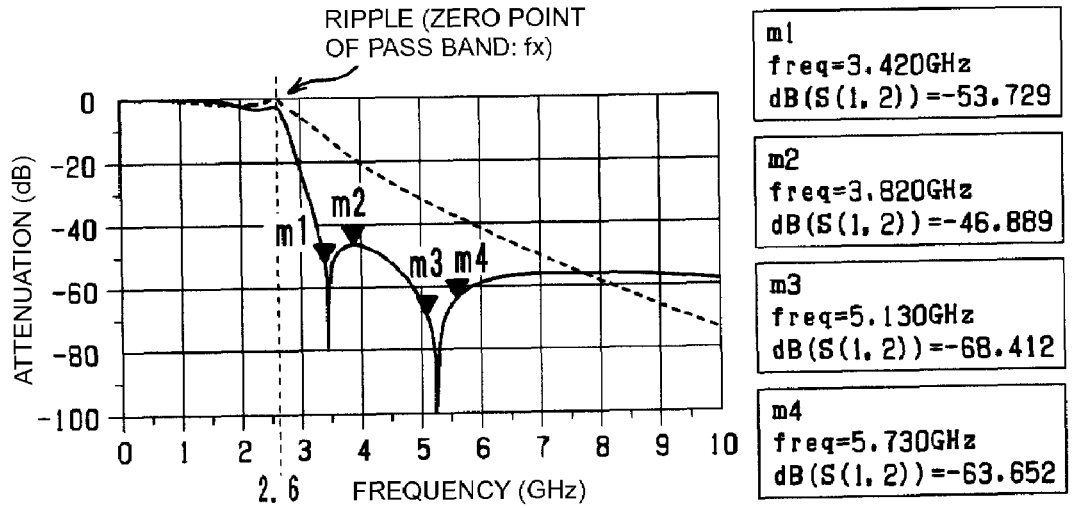
FIG. 12 is a graph illustrating high-frequency attenuation characteristics (inductance about 8.0 nH) in the equivalent circuit shown in FIG. 7.

FIG. 12 shows that, by further increasing the inductance of the inductor L to about 8.0 nH, the ripple frequency on the broken line is generated around 2.6 GHz, which is lower than the second higher harmonic band. This makes it possible to obtain a high level of attenuation in the second higher harmonic band and in the third higher harmonic band.

The inductances of the inductors and the capacitances of the capacitors indicated in the above-described various equivalent circuits are examples only, and the optimal values vary depending on the relationships between the inductors and the capacitors. As the high-frequency switch, a switching device other than the diode D, for example, a FET switch, such as a GaAs semiconductor switch, may be used. Preferred embodiments using various switching devices are described below.

First Preferred Embodiment, See FIGS. 13 through 17

Figure 13:
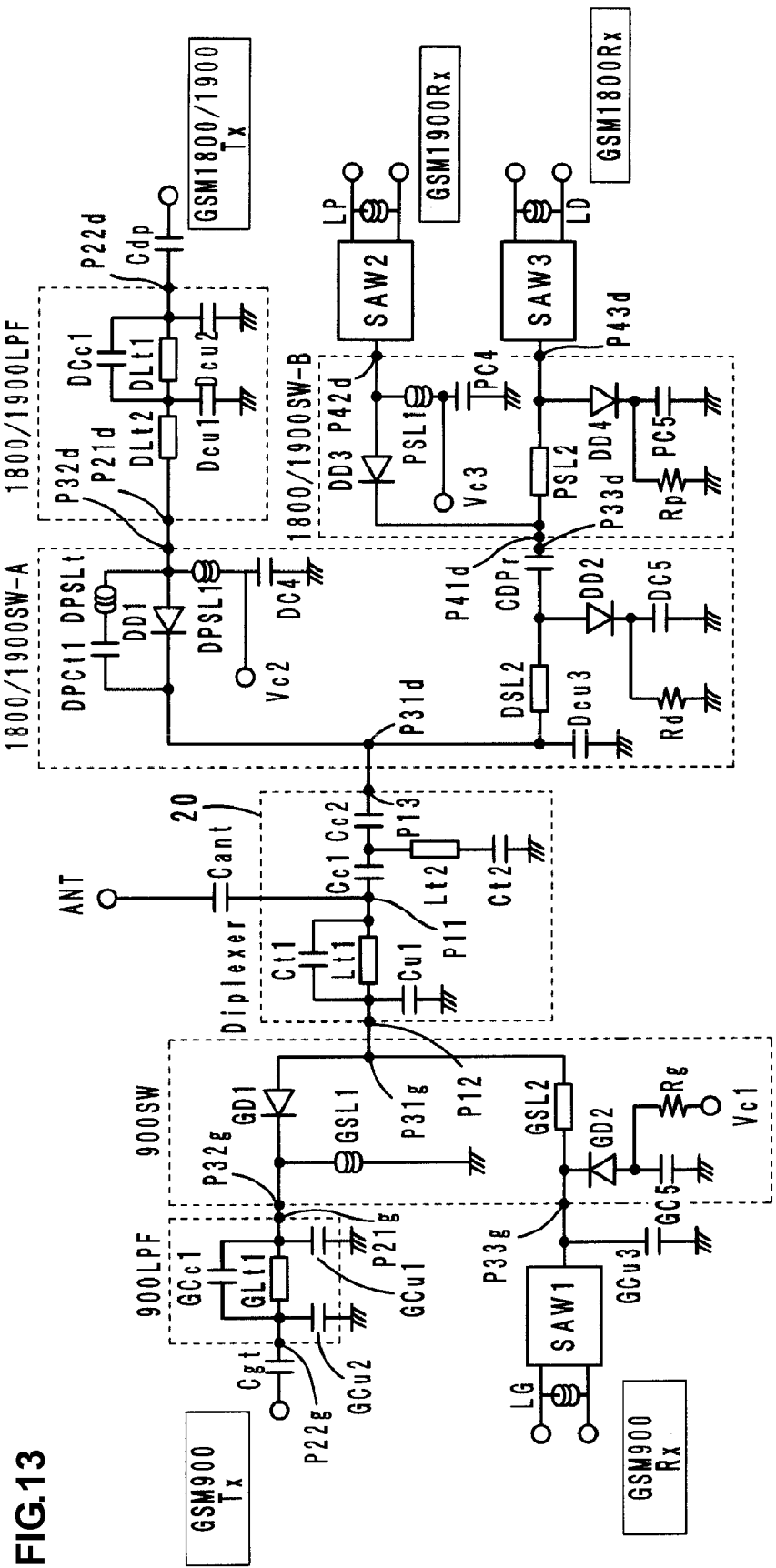
FIG. 13 is a block diagram illustrating a high-frequency switching module according to a first preferred embodiment of the present invention.

A first preferred embodiment is a triple-band high-frequency switching module (front-end module) compatible with three communication systems (GSM900 and GSM1800/1900 systems), as indicated by the equivalent circuit shown in FIG. 13.

More specifically, at the stage after the antenna terminal ANT, a diplexer 20 for separating the GSM900 signal path and the GSM1800/1900 signal path from each other is provided. On the GSM900 signal path, a first frequency switch 900SW, a first LC filter 900LPF, and a first balanced surface acoustic wave filter SAW1 are disposed. Similarly, on the GSM1800/1900 signal path, a second high-frequency switch GSM1800/1900SW-A, a second LC filter 1800/1900LPF, a third high-frequency switch 1800/1900SW-B, and second balanced surface acoustic wave filters SAW2 and SAW3 are disposed.

The first frequency switch 900SW selectively switches between the signal path between the antenna terminal ANT and a first transmission input terminal GSM900Tx (i.e., the transmission path for GSM900 transmission signals) and the signal path between the antenna terminal ANT and a first reception balanced output terminal GSM900Rx (i.e., the transmission path for GSM900 reception signals). The first LC filter 900LPF is disposed between the first high-frequency switch 900SW and the first transmission input terminal GSM900Tx, i.e., on the transmission path for GSM900 transmission signals. The first balanced surface acoustic wave filter SAW1 is disposed between the first high-frequency switch 900SW and the first reception balanced output terminal GSM900Rx, i.e., on the transmission path for GSM900 reception signals.

For the phase adjustments between the balanced output terminals, an inductor LG is connected in parallel between the first balanced surface acoustic wave filter SAW1 and the first reception balanced output terminal GSM900Rx.

The second high-frequency switch GSM1800/1900SW-A selectively switches the signal path between the antenna terminal ANT and a second transmission input terminal GSM1800/1900Tx (i.e., the transmission path for GSM1800/1900 transmission signals) and the signal path between the antenna terminal ANT and each of second and third reception balanced output terminals GSM1900Rx and GSM1800Rx (i.e., the transmission path for GSM1800/1900 reception signals). The second LC filter 1800/1900LPF is disposed between the second high-frequency switch GSM1800/1900SW-A and the second transmission input terminal GSM1800/1900Tx, i.e., on the transmission path for GSM1800/1900 transmission signals.

The third high-frequency switch 1800/1900SW-B selectively switches between the signal path between the second high-frequency switch GSM1800/1900SW-A and the second reception balanced output terminal GSM1900Rx (i.e., the transmission path for GSM1900 reception signals) and the signal path between the second high-frequency switch GSM1800/1900SW-A and the third reception balanced output terminal GSM1800Rx (i.e., the transmission path for GSM1800 reception signals). The second balanced surface acoustic wave filters SAW2 and SAW3 are disposed in the transmission paths between the third high-frequency switch 1800/1900SW-B and the second and third reception balanced output terminals GSM1900Rx and GSM1800Rx, respectively, i.e., on the transmission path for GSM1900 reception signals and the signal path for GSM1800 reception signals.

For the phase adjustments between the balanced output terminals, inductors LP and LD are disposed between the second balanced surface acoustic wave filters SAW2 and SAW3 and the second and third reception balanced output terminals GSM1900Rx and GSM1800Rx, respectively.

When performing a transmission operation, the diplexer 20 sends a transmission signal from the GSM900 system or the GSM1800/1900 system to the antenna terminal ANT, and, when performing a reception operation, the diplexer 20 sends a reception signal received by the antenna ANT to the GSM900 system or the GSM1800/1900 system. In the diplexer 20, the antenna terminal ANT is connected to a first port P11, a first port P31g of the first high-frequency switch 900SW is connected to a second port P12, and a first port P31d of the second high-frequency switch GSM1800/1900SW-A is connected to a third port P13.

In the GSM900 system, a first port P21g of the first LC filter 900LPF is connected to a second port P32g of the first high-frequency switch 900SW, and the first balanced surface acoustic wave filter SAW1 is connected to a third port P33g of the first high-frequency switch 900SW. The first transmission input terminal GSM900Tx is connected to a second port P22g of the first LC filter 900LPF.

In the GSM1800/1900 system, a first port P21d of the second LC filter 1800/1900LPF is connected to a second port P32d of the second high-frequency switch GSM1800/1900SW-A, and a first port P41d of the third high-frequency switch 1800/1900SW-B is connected to a third port P33d of the second high-frequency switch GSM1800/1900SW-A. The second transmission input terminal GSM1800/1900Tx is connected to a second port P22d of the second LC filter 1800/1900LPF. The second balanced surface acoustic wave filters SAW2 and SAW3 are connected to a second port P42d and a third port P43d, respectively, of the third high-frequency switch 1800/1900SW-B.

The diplexer 20 includes inductors Lt1 and Lt2 and capacitors Cc1, Cc2, Ct1, Ct2, and Cu1. A parallel circuit defined by the inductor Lt1 and the capacitor Ct1 is connected between the first port P11 and the second port P12, and the node of this parallel circuit on the side of the second port P12 is grounded via the capacitor Cu1. The capacitors Cc1 and Cc2 are connected in series to each other between the first port P11 and the third port P13 and the node of the capacitors Cc1 and Cc2 are grounded via the inductor Lt2 and the capacitor Ct2. That is, the inductor Lt1 and the capacitors Ct1, Cc1, and Ct2 define a high-pass filter.

The first high-frequency switch 900SW includes diodes GD1 and GD2, which function as switching devices, inductors GSL1 and GSL2, a capacitor GC5, and a resistor Rg. A diode GD1 is connected between the first port P31g and the second port P32g such that the anode of the diode GD1 is disposed on the side of the first port P31g and the cathode thereof is grounded via the inductor GSL1. The cathode of the diode GD2 is connected to the first port P31g with the inductor GSL2 therebetween, and the anode thereof is grounded via the capacitor GC5. A control terminal Vc1 is connected to the node between the diode GD2 and the capacitor GC5 with the resistor Rg therebetween. The node between the cathode of the diode GD2 and the third port P33g is grounded via a capacitor GCu3.

The second high-frequency switch GSM1800/1900SW-A includes diodes DD1 and DD2, which function as switching devices, inductors DPSL1, DSL2, and DPSLt, capacitors DC4, DC5, CDPr, Dcu3, and DPCt1, and a resistor Rd. The diode DD1 is connected between the first port P31d and the second port P32d such that the cathode of the diode DD1 is disposed on the side of the first port P31d, and the anode thereof is grounded via the inductor DPSL1 and the capacitor DC4. Additionally, a series circuit of the capacitor DPCt1 and the inductor DPSLt is connected in parallel to the diode DD1 between the first port P31d and the second port P32d.

The anode of the diode DD2 is connected to the first port P31d with the inductor DSL2 therebetween and is also grounded via the capacitor Dcu3. The cathode of the diode DD2 is ground via the capacitor DC5. The anode of the diode DD2 is connected to the third port P33d with the capacitor CDPr therebetween, and the node between the cathode and the capacitor DC5 is grounded via the resistor Rd. A control terminal Vc2 is connected to the node between the inductor DPSL1 and the capacitor DC4.

In the first LC filter 900LPF, a parallel circuit defined by an inductor GLt1 and a capacitor GCc1 is connected to the first port P21g and the second port P22g. Both the terminals of the inductor GLt1 are grounded via capacitors GCu1 and GCu2, respectively. Additionally, a capacitor Cgt is connected between the second port P22g and the first transmission input terminal GSM900Tx.

In the second LC filter 1800/1900LPF, inductors DLt2 and DLt1 are connected in series between the first port P21d and the second port P22d, and a parallel circuit defined by the inductor DLt1 and a capacitor DCc1 is connected between the first port P21d and the second port P22d. Both the terminals of the inductor DLt1 are grounded via capacitors DCu1 and DCu2, respectively. A capacitor Cdp is connected between the second port P22d and the second transmission input terminal GSM1800/1900Tx.

In the third high-frequency switch 1800/1900SW-B, a diode DD3 is connected between the first port P41d and the second port P42d, and the anode of the diode DD3 is grounded via an inductor PSL1 and a capacitor PC4. A control terminal Vc3 is connected to the node between the inductor PSL1 and the capacitor PC4. Additionally, an inductor PSL2 is connected between the first port P41d and the third port P43d. The anode of a diode DD4 is connected to the node between the inductor PSL2 and the third port P43d, and the cathode of the diode DD4 is grounded via a capacitor PC5. The node between the cathode of the diode DD4 and the capacitor PC5 is grounded via a resistor Rp.

In the first preferred embodiment configured as described above, one of the unique features of the first preferred embodiment resides in that the inductor DLt2 of the second LC filter 1800/1900LPF is connected directly and in series to the anode of the diode DD1. The inductor DLt2 has the function of shifting the cut-off frequency of the low-pass filter circuit produced when the diode DD1 is turned ON to the lower frequency side and of suppressing the ripple to a small level, as shown in FIGS. 6B and 6C.

In order to implement functions similar to the functions described above, an inductor may be disposed between the first LC filter 900LPF and the diode GD1.

Figure 14:
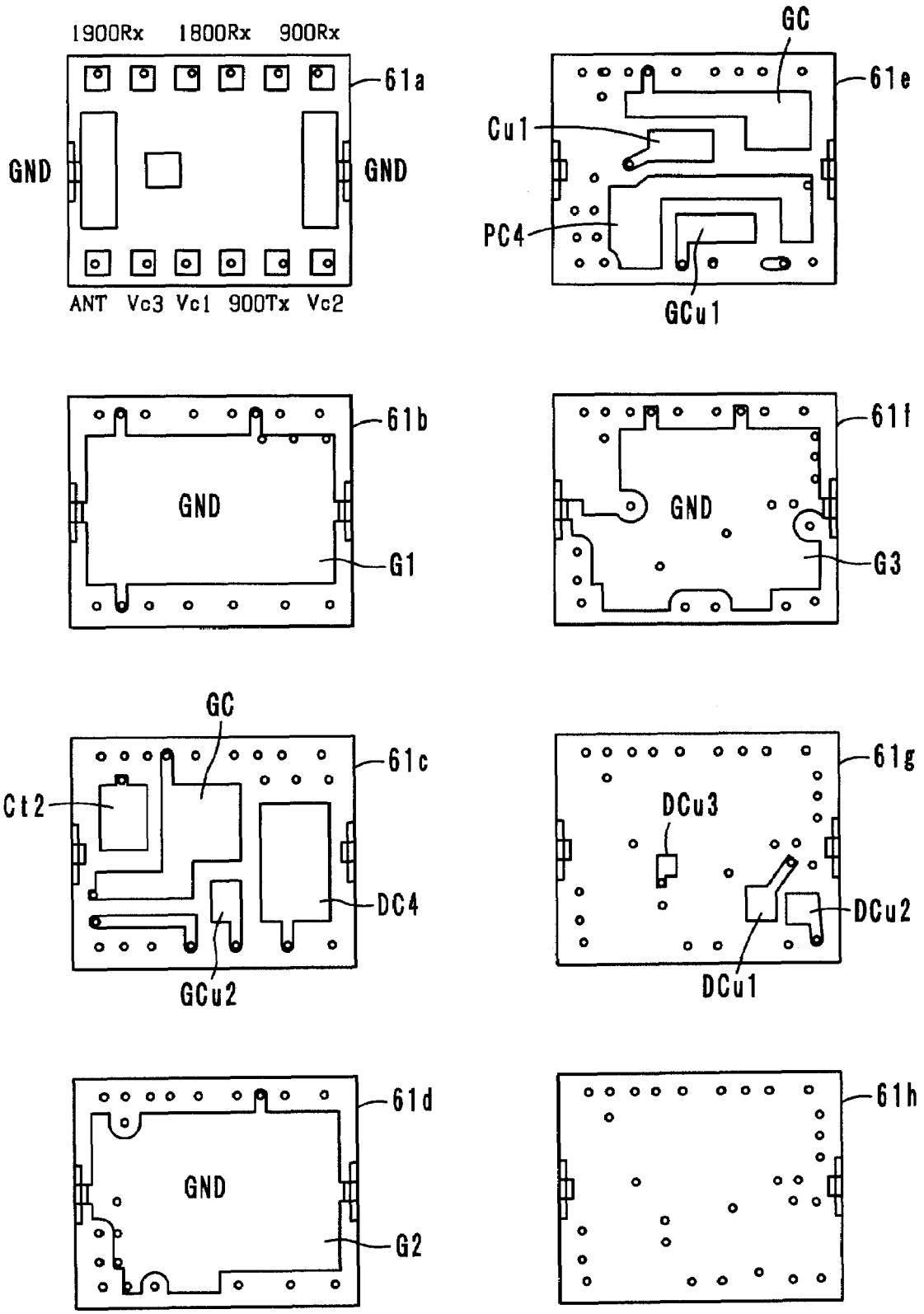
FIG. 14 illustrates the configurations of electrodes formed on the sheet layers (first through eighth layers from the bottom) of a ceramic multilayer substrate used in the first preferred embodiment of the present invention.
Figure 15:
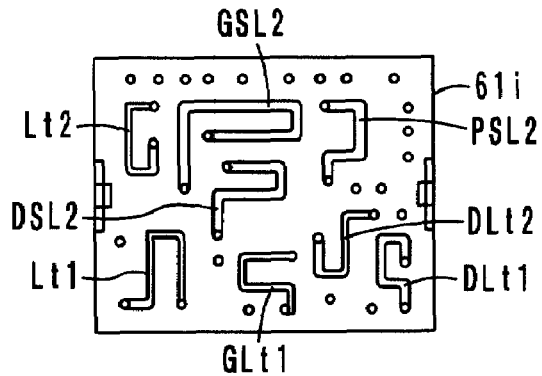
FIG. 15 illustrates the configurations of electrodes formed on the sheet layers (ninth through fifteenth layers from the bottom) of the ceramic multilayer substrate used in the first preferred embodiment of the present invention.
Figure 15:
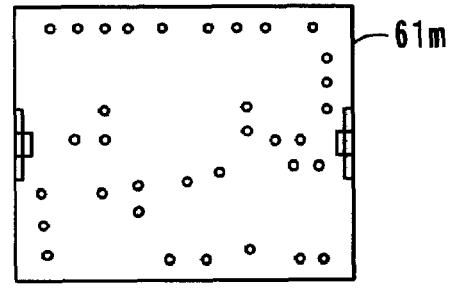
Figure 15:
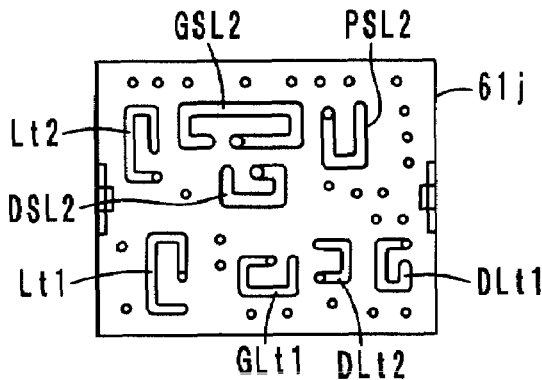
Figure 15:
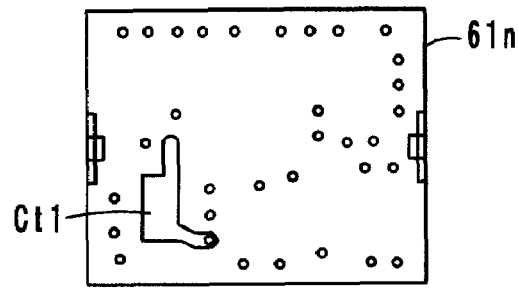
Figure 15:
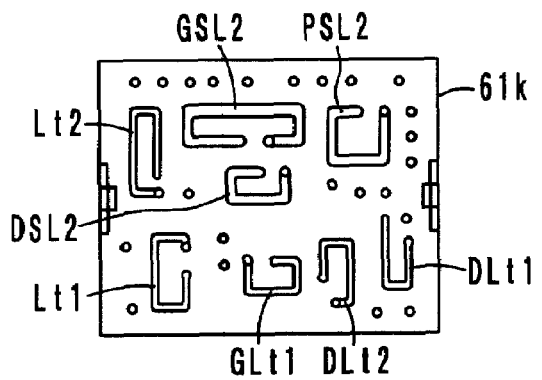
Figure 15:
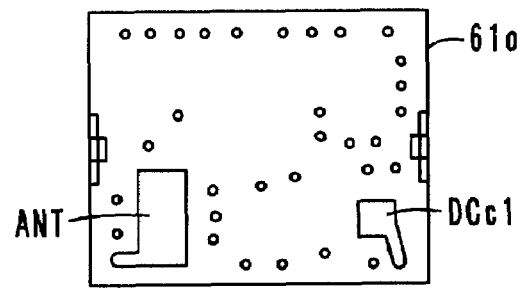
Figure 15:
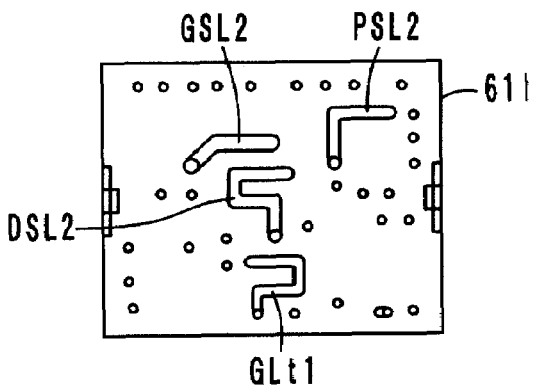
Figure 16:
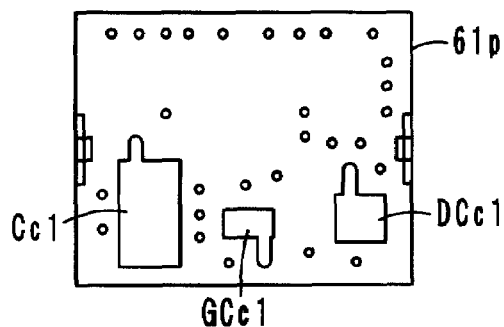
FIG. 16 illustrates the configurations of electrodes formed on the sheet layers (sixteenth through twenty-second layers from the bottom) of the ceramic multilayer substrate used in the first preferred embodiment of the present invention.
Figure 16:
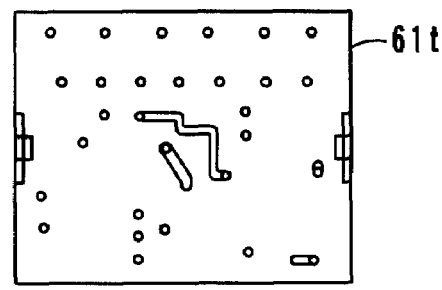
Figure 16:
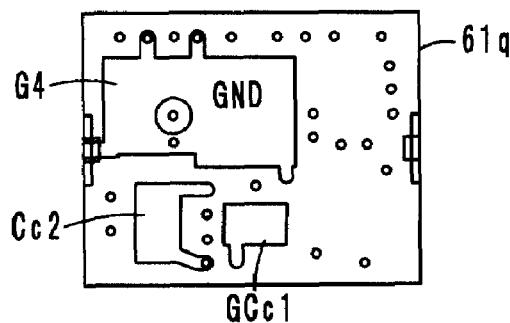
Figure 16:
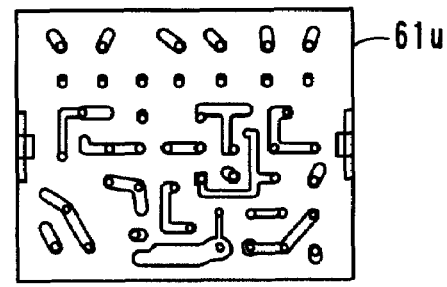
Figure 16:
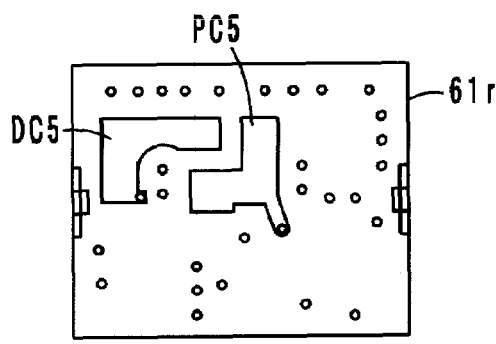
Figure 16:
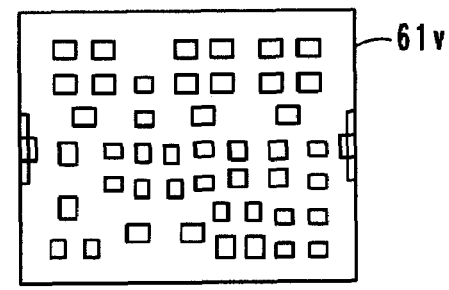
Figure 16:
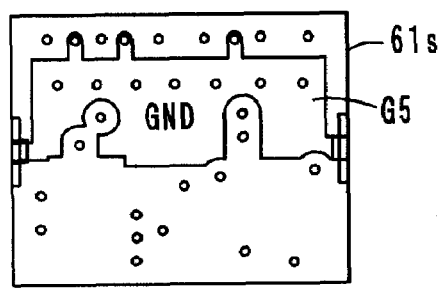

FIGS. 14 through 16 illustrate capacitor electrodes and stripline electrodes preferably formed by, for example, screen-printing, on sheet layers that form a ceramic multilayer substrate of the high-frequency switching module of the first embodiment. The ceramic multilayer substrate is preferably formed by sequentially laminating first through twenty-second sheet layers 61a through 61v made of ceramics mainly consisting of barium oxide, aluminum oxide, and silica, from the bottom and by firing the laminated sheet layers 61a through 61v at a temperature of about 1,000° C. or less.

On the first sheet layer 61a, various external connecting terminal electrodes are provided. On the second sheet layer 61b, a ground electrode G1 is disposed. On the third sheet layer 61c, the electrodes of the capacitors Ct2, GC, GCu2, and DC4 are arranged so that they define a capacitance with the ground electrode G1. On the fourth sheet layer 61d, the ground electrode G2 is disposed. On the fifth sheet layer 61e, the electrodes of the capacitors GC, Cu1, PC4, and GCu1 are arranged so that they define a capacitance with the ground electrode G2.

On the sixth sheet layer 61f, the ground electrode G3 is formed, and on the seventh sheet layer 61g, the electrodes of the capacitors DCu1, DCu2, and DCu3 are arranged so that they define a capacitance with the ground electrode G3. On the ninth, tenth, and eleventh sheet layers 61i, 61j, and 61k, the inductors Lt1, Lt2, DLt1, DLt2, GLt1, DSL2, GSL2, and PSL2 are arranged by using stripline electrodes and are connected to each other through via-hole conductors. On the twelfth sheet layer 61l, the inductors GLt1, DSL2, GSL2, and PSL2 are preferably constructed by using stripline electrodes and the inductors of the same type are connected to each other through via-hole conductors.

On the fourteenth sheet layer 61n, the electrode of the capacitor Ct1 is disposed, and on the fifteenth sheet layer 61o, the electrode of the capacitor DCc1 and the electrode of the antenna terminal ANT are disposed. On the sixteenth sheet layer 61p, the electrodes of the capacitors Cc1, GCc1, and DCc1 are disposed. On the seventeenth sheet layer 61q, the electrodes of the capacitors Cc2 and GCc1 and the ground electrode G4 are disposed. On the eighteenth sheet layer 61r, the electrodes of the capacitors DC5 and PC5 are disposed, and on the nineteenth sheet layer 61s, the ground electrode G5 is disposed.

Figure 17:
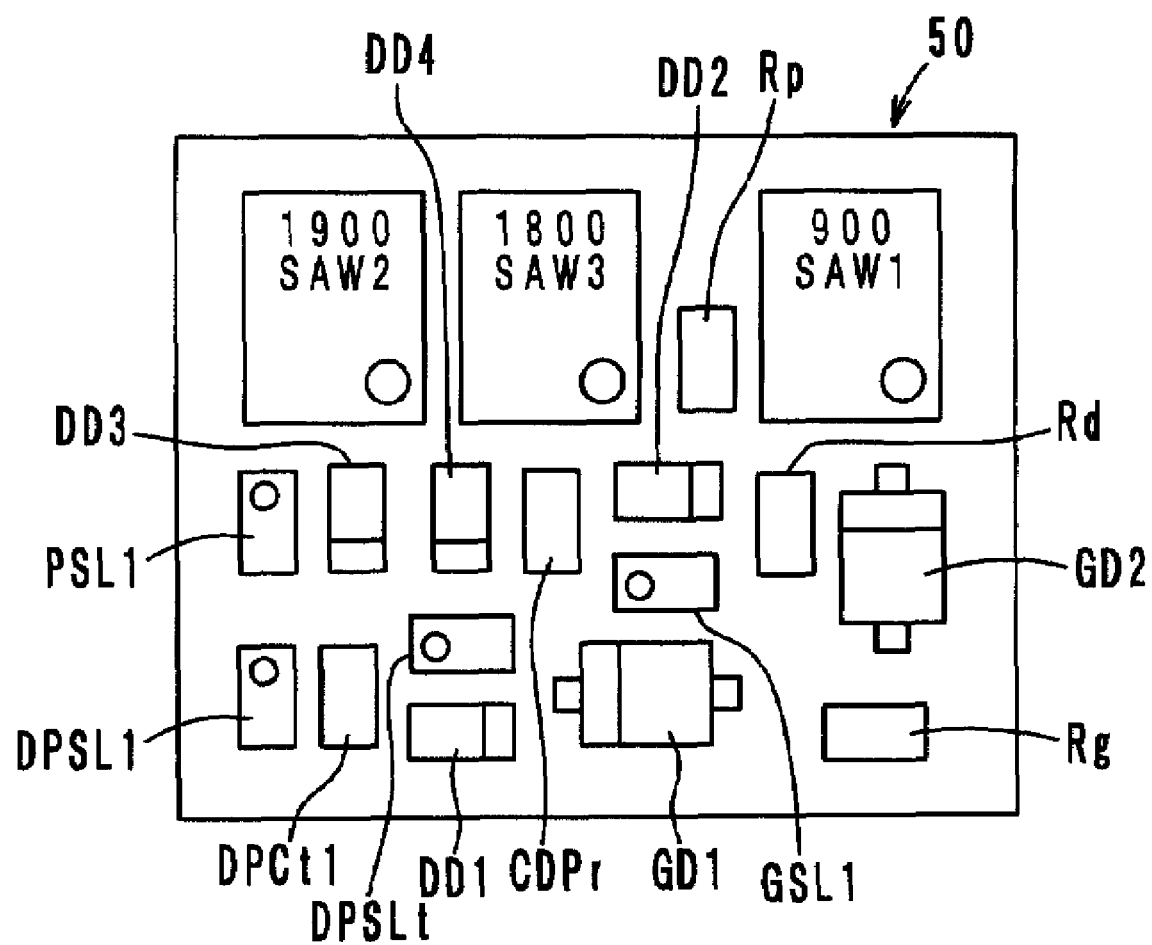
FIG. 17 is a plan view illustrating the state in which circuit devices are mounted on the obverse surface of the ceramic multiplayer substrate used in the first preferred embodiment of the present invention.

The obverse surface of the twenty-second sheet layer 61v defines the obverse surface of a ceramic multilayer substrate 50, as shown in FIG. 17, and various connecting terminal electrodes are disposed thereon. On the obverse surface of the ceramic multiplayer substrate 50, the first, second, and third surface acoustic wave filters SAW1, SAW2, and SAW3, and the diodes GD1, GD2, DD1, DD2, DD3, and DD4 are mounted. The resistors Rg, Rd, and Rp are also mounted, the inductors DPCt1, DPSL1, DPSLt, GSL1, and PSL1, and the capacitor CDPr are also mounted.

The operation performed by the high-frequency switching module having the circuit configuration shown in FIG. 13 is discussed below. When transmitting a GSM1800/1900 transmission signal, in the second high-frequency switch GSM1800/1900SW-A, a 3 V, for example, is applied to the control terminal Vc2 to turn ON the diodes DD1 and DD2. Then, the GSM1800/1900 transmission signal passes through the second LC filter 1800/1900LPF, the second high-frequency switch GSM1800/1900SW-A, and the diplexer 20 and is transmitted through the antenna terminal ANT connected to the first port P11 of the diplexer 20.

In this case, in the first high-frequency switch 900SW, 0 V, for example, is applied to the control terminal Vc1 to turn OFF the diode GD1 so that a GSM900 transmission signal can be prevented from being transmitted. By the connection of the diplexer 20, a GSM1800/1900 transmission signal can be prevented from entering the first transmission input terminal GSM900Tx and the first reception balanced output terminal GSM900Rx. In the second LC filter 1800/1900LFP, the GSM1800/1900 second higher harmonics and third higher harmonics are attenuated.

Then, when transmitting a GSM900 transmission signal, in the first high-frequency switch 900SW, a 3 V, for example, is applied to the control terminal Vc1 to turn ON the diodes GD1 and GD2. Then, the GSM900 transmission signal passes through the first LC filter 900LPF, the first high-frequency switch GSM900SW, and the diplexer 20 and is transmitted through the antenna terminal ANT connected to the first port P11 of the diplexer 20.

In this case, in the second high-frequency switch GSM1800/1900SW-A, 0 V, for example, is applied to the control terminal Vc2 to turn OFF the diode DD1 so that a GSM1800/1900 transmission signal can be prevented from being transmitted. By the connection of the diplexer 20, a GSM900 transmission signal can be prevented from entering the second transmission input terminal GSM1800/1900Tx and the second and third reception balanced output terminals GSM1900Rx and GSM1800Rx.

In the low-pass filter including the capacitor Ct1, the inductor Lt1, and the shunt capacitor Cu1 of the diplexer 20, the GSM900 second higher harmonics are attenuated. In the first LC filter 900LPF, the GSM900 third higher harmonics are attenuated.

Then, when receiving a GSM1800/1900 reception signal and a GSM900 reception signal, in the second high-frequency switch GSM1800/1900SW-A, 0 V, for example, is applied to the control terminal Vc2 to turn OFF the diodes DD1 and DD2 so that the GSM900 reception signal can be prevented from entering the second transmission input terminal GSM1800/1900Tx, and also, in the first high-frequency switch 900SW, 0 V, for example, is applied to the control terminal Vc1 to turn OFF the diodes GD1 and GD2, so that the GSM1800/1900 reception signal can be prevented from entering the first transmission input terminal GSM900Tx. In this manner, the signals input through the antenna terminal ANT are output to the second and third reception balanced output terminals GSM1900Rx and GSM1800Rx and the first balanced output terminal GSM900Rx.

When receiving a GSM1800/1900 reception signal, in the third high-frequency switch 1800/1900SW-B, the diodes DD3 and DD4 are turned ON so that the reception signal is output to the second reception balanced output terminal GSM1900Rx. If the diodes DD3 and DD4 are turned OFF, the reception signal is output to the third reception balanced output terminal GSM1800Rx.

By the connection of the diplexer 20, a GSM1800/1900 reception signal and a GSM900 reception signal can be prevented from entering the GSM900 system and the GSM1800/1900 system, respectively.

Figure 18:
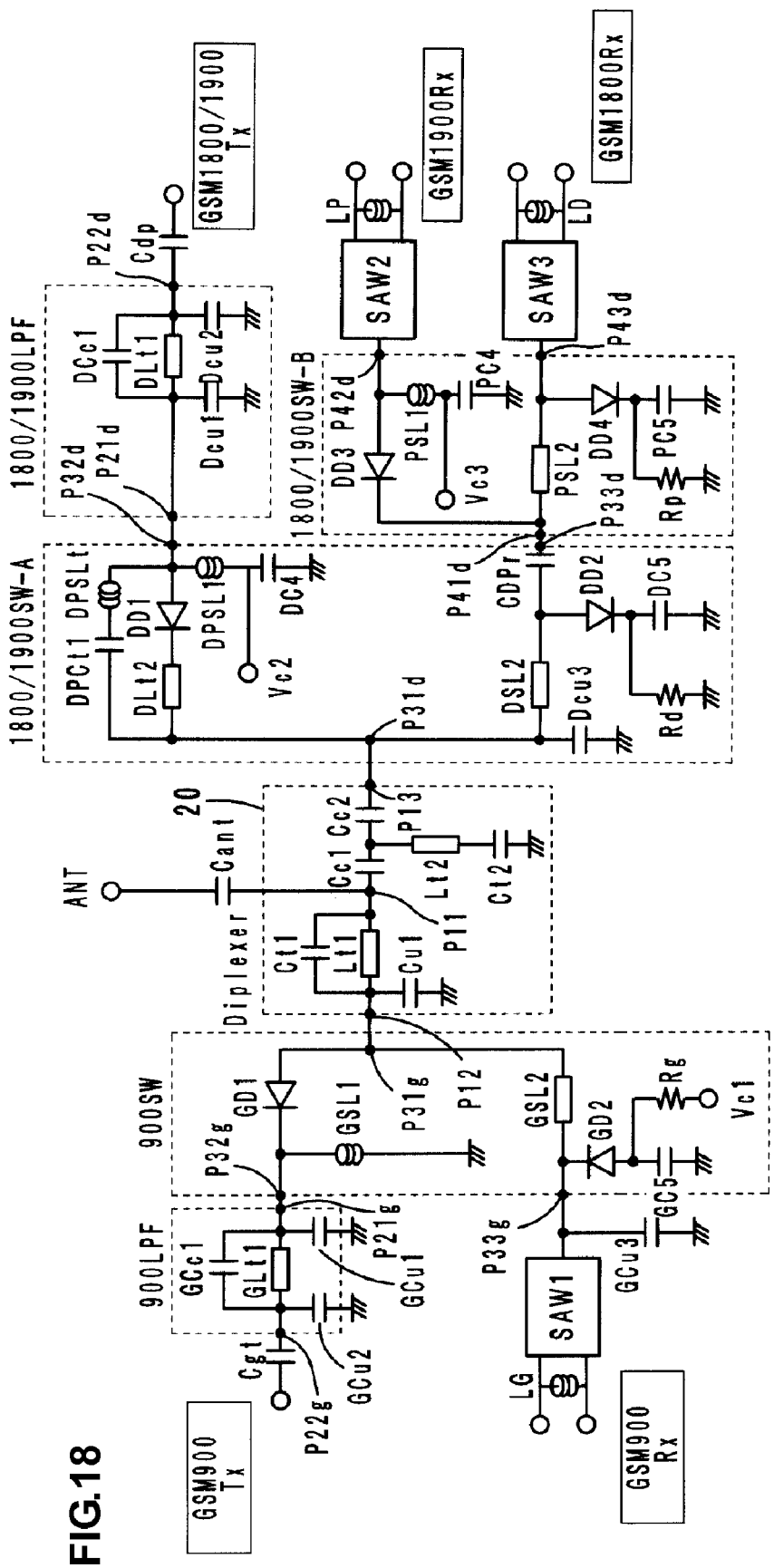
FIG. 18 is a block diagram illustrating a high-frequency switching module according to a second preferred embodiment of the present invention.

Second Preferred Embodiment, See FIG. 18

A second preferred embodiment is a triple-band high-frequency switching module (front-end module) compatible with three communication systems (GSM900 and GSM1800/1900 systems), as indicated by the equivalent circuit shown in FIG. 18.

The basic configuration of the second preferred embodiment is similar to that of the first preferred embodiment, except that, in the second high-frequency switch 1800/1900SW-A, the inductor DLt2 is connected to the cathode of the diode DD1. In this configuration as well as in the configuration of the first preferred embodiment, the inductor DLt2 has the function of shifting the cut-off frequency to the lower frequency side and of suppressing the ripple to a small level, as shown in FIG. 6, when the diode DD1 is turned ON.

In the second preferred embodiment, the other aspects of the configuration are similar to those of the first preferred embodiment, and thus, a duplicate explanation is omitted.

Figure 19:
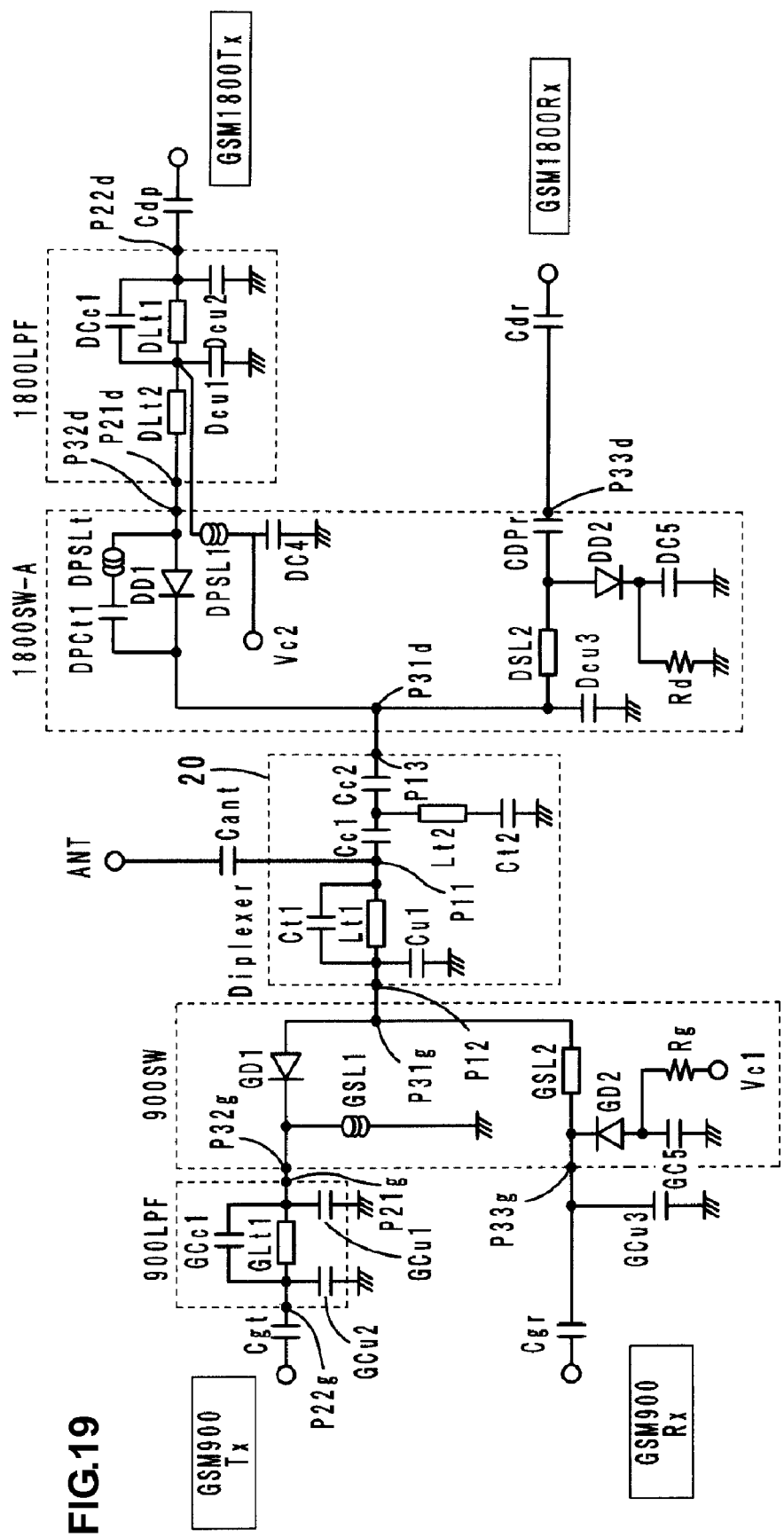
FIG. 19 is a block diagram illustrating a high-frequency switching module according to a third preferred embodiment of the present invention.

Third Preferred Embodiment, See FIG. 19

A third preferred embodiment is a dual-band high-frequency switching module (front-end module) compatible with two communication systems (GSM900 and GSM1800 systems), as indicated by the equivalent circuit shown in FIG. 19.

In the third preferred embodiment, the GSM1900 circuits and the surface acoustic wave filters SAW1, SAW2, and SAW3 that are provided in the first preferred embodiment are omitted. Additionally, a capacitor Cgr is connected between the first high-frequency switch 900SW and the first reception balanced output terminal GSM900Rx, and a capacitor Cdr is connected between the second high-frequency switch 1800SW-A and the second reception balanced output terminal GSM1800Rx. One end of the inductor DPSL1 in the second high-frequency switch 1800SW-A is connected to the node between the inductors DLt1 and DLt2.

In the third preferred embodiment, the inductor DLt2 has the function of shifting the cut-off frequency to the lower frequency side and of suppressing the ripple to a small level, as shown in FIG. 6, when the diode DD1 is turned ON.

Figure 20:
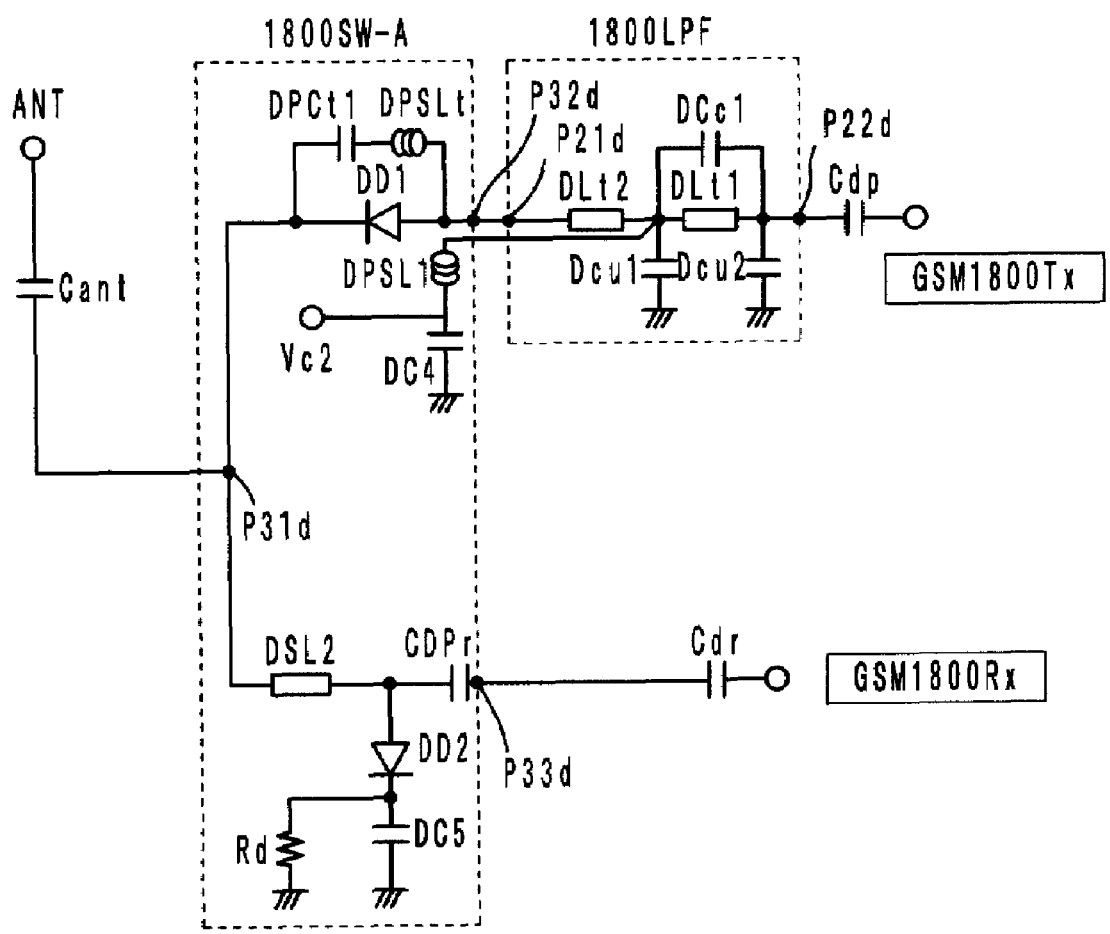
FIG. 20 is a block diagram illustrating a high-frequency switching module according to a fourth preferred embodiment of the present invention.

Fourth Preferred Embodiment, See FIG. 20

A fourth preferred embodiment is a single-band high-frequency switching module (front-end module) compatible with one communication system (GSM1800 system), as indicated by the equivalent circuit shown in FIG. 20.

In the fourth preferred embodiment, the GSM900 circuits and the diplexer 20 provided for the third preferred embodiment are omitted. In the fourth preferred embodiment, the inductor DLt2 has the function of shifting the cut-off frequency to the lower frequency side and of suppressing the ripple to a small level, as shown in FIG. 6, when the diode DD1 is turned ON.

Figure 21:
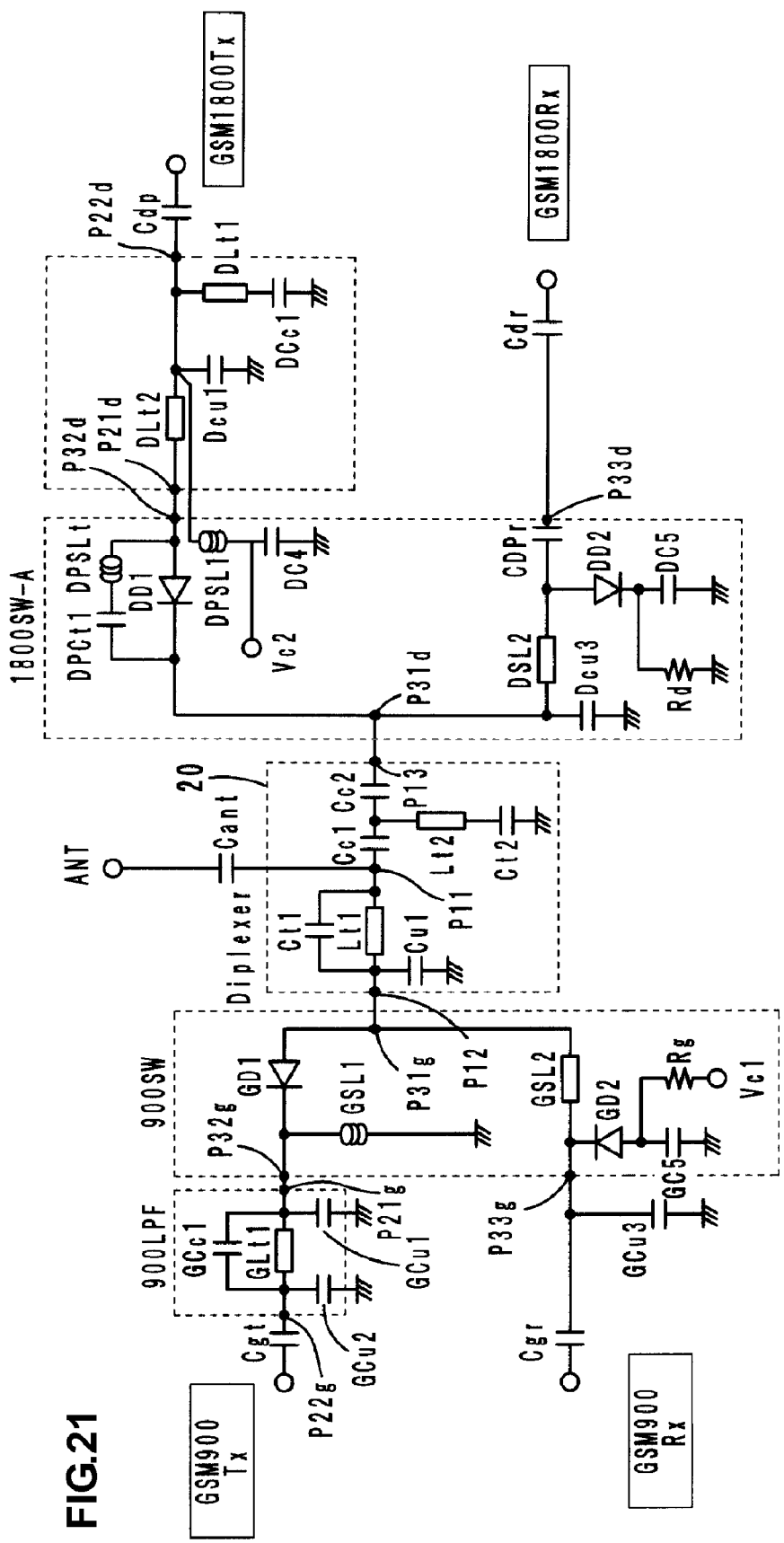
FIG. 21 is a block diagram illustrating a high-frequency switching module according to a fifth preferred embodiment of the present invention.

Fifth Preferred Embodiment, See FIG. 21

A fifth preferred embodiment is a dual-band high-frequency switching module (front-end module) compatible with two communication systems (GSM900 and GSM1800 systems), as indicated by the equivalent circuit shown in FIG. 21.

The basic configuration of the fifth preferred embodiment is similar to that of the third preferred embodiment, except that the second LC filter 1800LPF is omitted and the inductor DLt1 is grounded via the capacitor DCc1. In the fifth preferred embodiment, too, the inductor DLt2 has the function of shifting the cut-off frequency to the lower frequency side and of suppressing the ripple to a small level, as shown in FIG. 6, when the diode DD1 is turned ON.

Sixth Preferred Embodiment, See FIGS. 22 through 27

Figure 22:
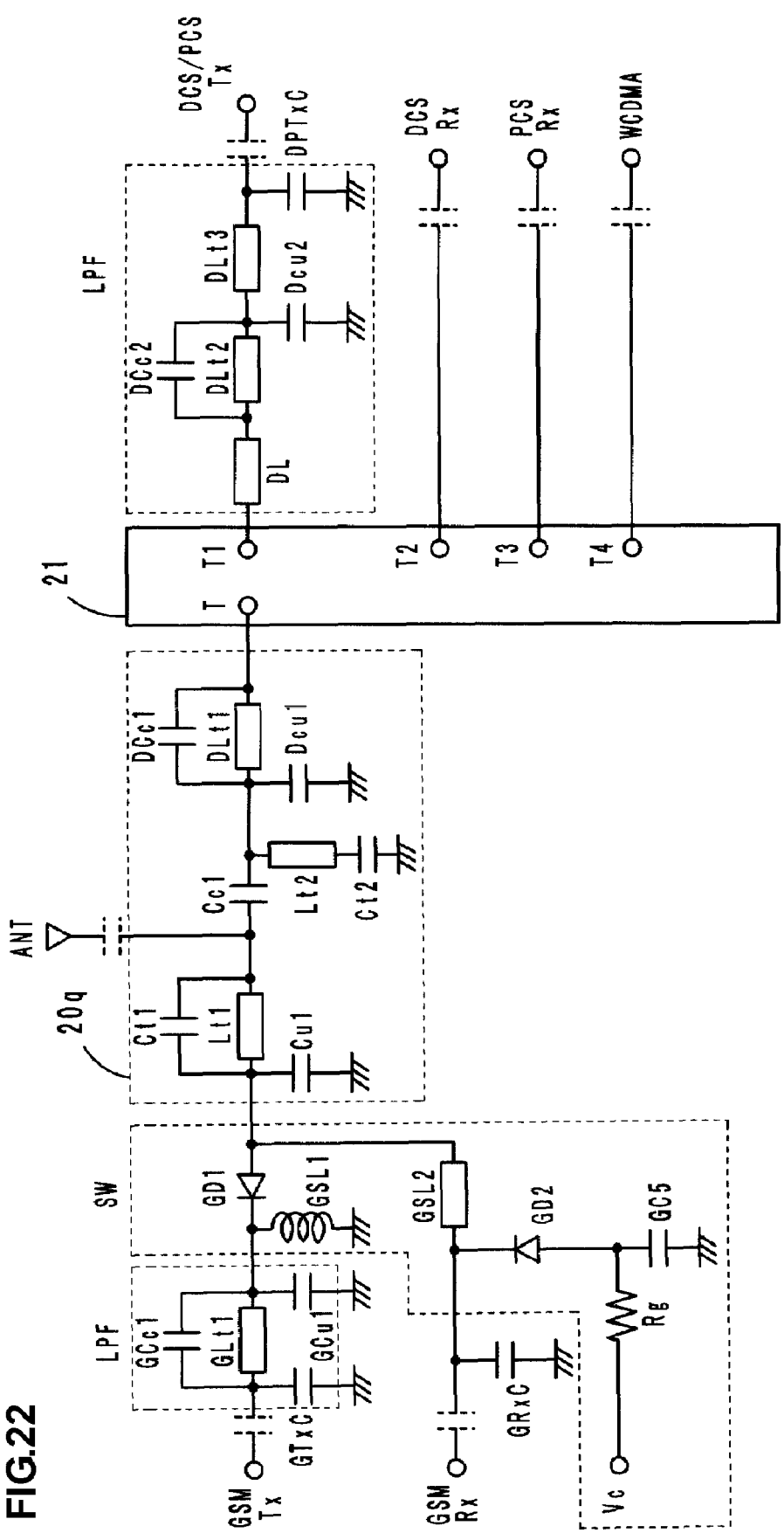
FIG. 22 is a block diagram illustrating a high-frequency switching module according to a sixth preferred embodiment of the present invention.

A sixth preferred embodiment is a quad-band high-frequency switching module (front-end module) compatible with four communication systems (GSM, DCS, PCS, and WCDMA systems), as indicated by the equivalent circuit shown in FIG. 22.

In the sixth preferred embodiment, the GSM transmission-signal transmission path and reception-signal transmission path are similar to those of the third preferred embodiment, and instead of using the second high-frequency switch 1800SW-A provided in the third preferred embodiment, an FET switch (more specifically, a GaAs switch 21) is disposed between a diplexer 20q and the DCS/PCS transmission-signal transmission path and reception-signal transmission paths and the WCDMA reception-signal transmission path.

In the diplexer 20q, in addition to the inductors Lt1 and Lt2 and the capacitors Ct1, Cu1, Cc1, and Ct2 provided in each of the above-described preferred embodiments, a parallel circuit defined by the inductor DLt1 and the capacitor DCc1 and the shunt capacitor Dcu1 are added for the DCS/PCS and WCDMA systems. The added low-pass filter is used for supplementing the DCS/PCS second LC filter LPF connected to the DCS/PCS transmission input terminal Tx.

Figure 28A:
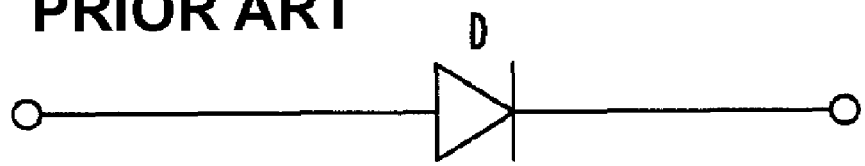
FIGS. 28A to 28C illustrate a known diode switch.
Figure 28B:
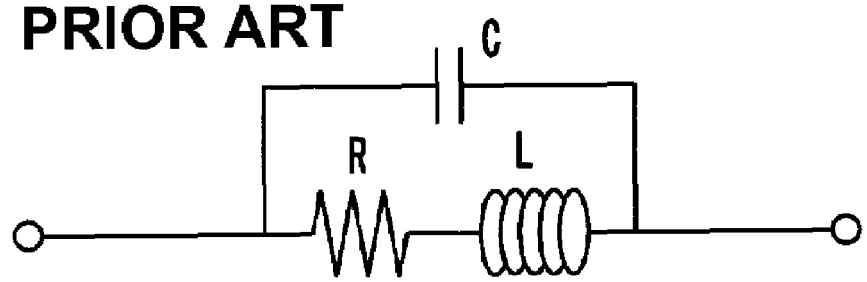
Figure 28C:
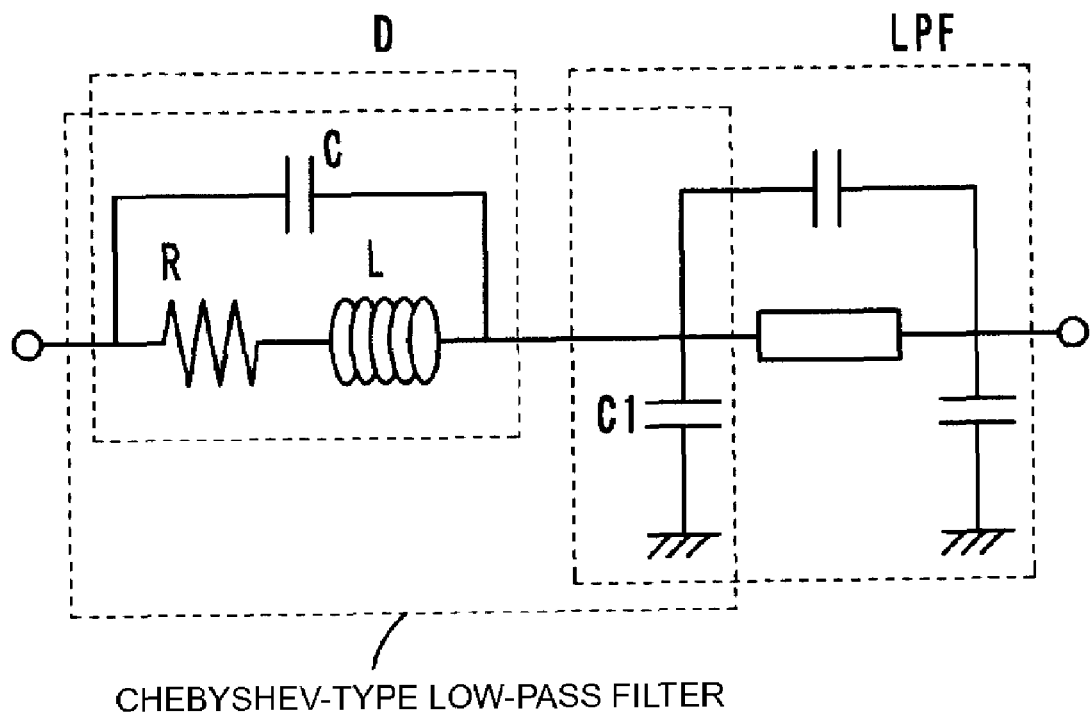

The GaAs switch 21 changes the connection of the terminal T to one of the terminals T1 through T4 to switch among the DCS/PCS transmission-signal transmission path, the DCS reception-signal transmission path, the PCS reception-signal transmission path, and the WCDMA reception-signal transmission path, respectively. When sending a DCS/PCS signal, as in the diode DD1, the GaAs switch 21 defines the circuit shown in FIG. 28B in which the capacitor C is connected in parallel to the resistor R and the inductor L connected in series to each other. Accordingly, the stray capacitance is generated by the shunt capacitor C1 shown in FIG. 28C so that this low-pass filter exhibits Chebyshev characteristics.

In the sixth preferred embodiment, the inductor DL is connected directly and in series to the GaAs switch 21. The DCS/PCS second LC filter LPF includes the inductors DL, DLt2, and DLt3, the capacitor DCc2 connected in parallel to the inductor DLt2, and the shunt capacitors Dcu2 and DPTxC.

Figure 23A:
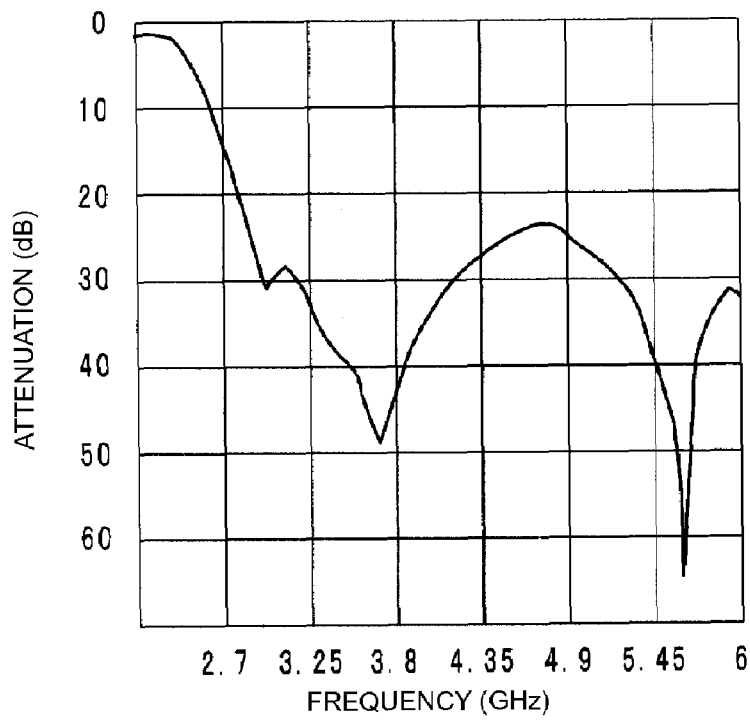
FIG. 23A is a graph illustrating high-frequency attenuation characteristics in the sixth embodiment of the present invention.
Figure 23B:
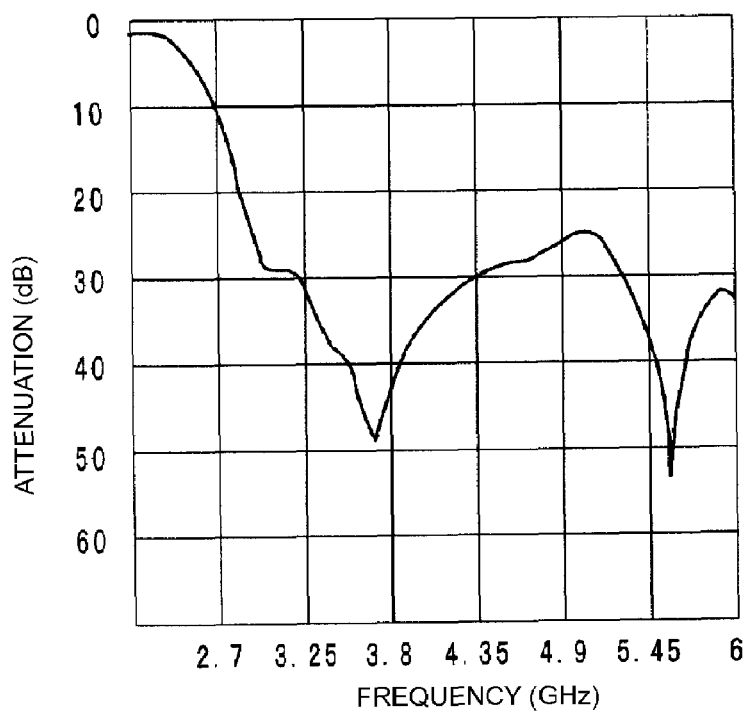
FIG. 23B is a graph illustrating high-frequency attenuation characteristics in a comparative example from which the inductor DL is removed from the circuit of the sixth embodiment of the present invention.

In the sixth preferred embodiment configured as described above, one of the unique features of the sixth preferred embodiment is that the inductor DL of the second LC filter LPF is connected directly and in series to the terminal T1 of the GaAs switch 21. The inductor DL has the function of shifting the cut-off frequency of the low-pass filter formed when the terminal T1 of the GaAs switch 21 is turned ON to the lower frequency side and of suppressing the ripple to a small level, as shown in FIGS. 6B and 6C, when the diode DD1 is turned ON. Also, the third higher harmonics can be attenuated. FIG. 23A illustrates attenuation characteristics when the inductor DL is inserted. FIG. 23B is shown for comparison with FIG. 23A and illustrates attenuation characteristics when the inductor DL is not inserted.

By providing the inductor DL, the ripple (sharp rise from the attenuation pole) generated in the 5.1 to 5.2 GHz band, which is about three times as high as the fundamental frequency (about 1.75 GHz), as shown in FIG. 23B, can be shifted to substantially the 4.7 GHz band, which is irrelevant to the high-order higher harmonics of the fundamental frequency, as shown in FIG. 23A without changing the attenuation pole of the second higher harmonics (about 3.7 GHz) of the fundamental frequency.

To achieve similar results as those described above, the inductor DL may be inserted directly and in series between the terminal T of the GaAs switch 21 and the diplexer 20q. Also, instead of using the GaAs switch 21, an FET switch, such as a CMOS switch, may be used.

Figure 24:
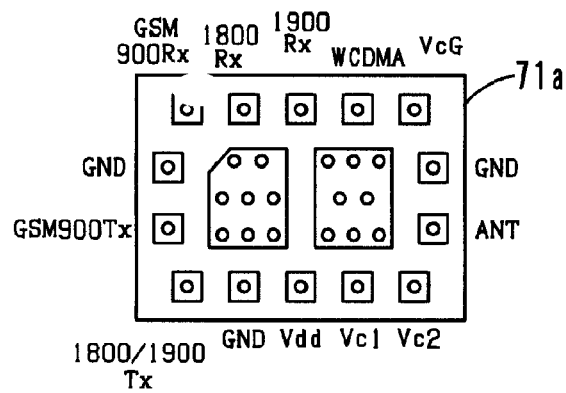
FIG. 24 illustrates the configurations of electrodes formed on the sheet layers (first through eighth layers from the bottom) of a ceramic multilayer substrate used in the sixth preferred embodiment of the present invention.
Figure 24:
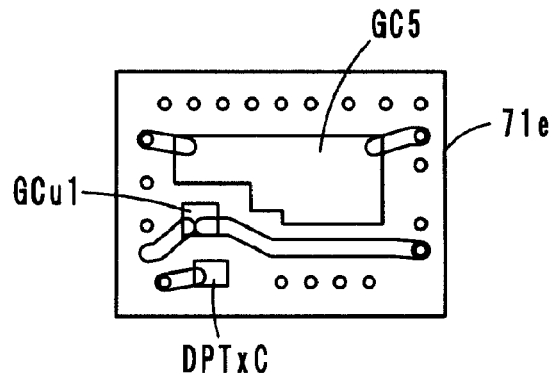
Figure 24:
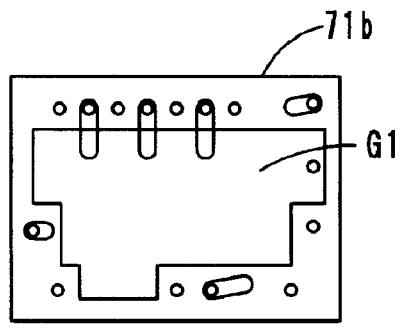
Figure 24:
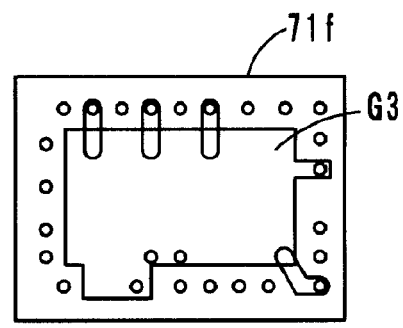
Figure 24:
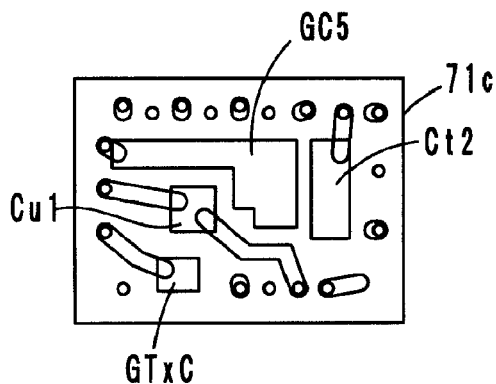
Figure 24:
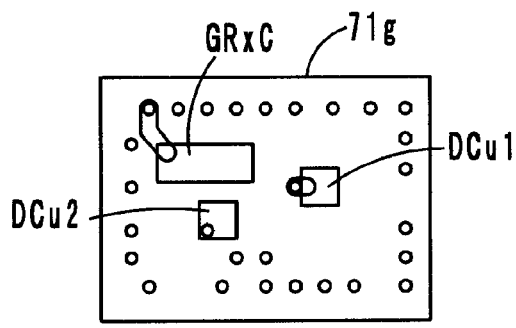
Figure 24:
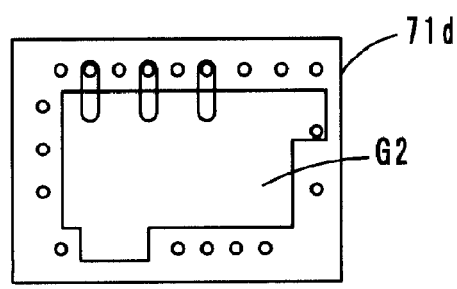
Figure 24:
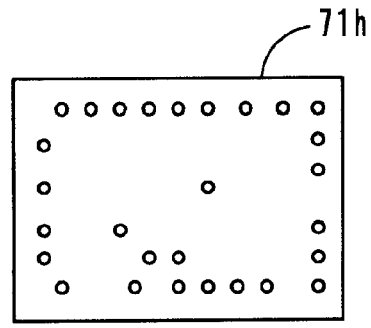
Figure 25:
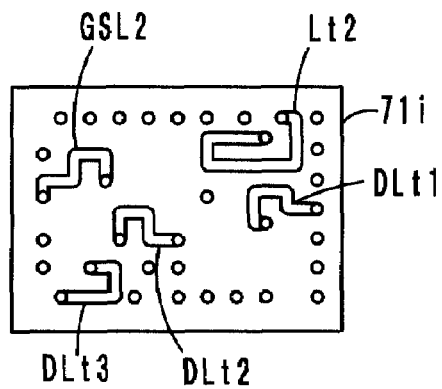
FIG. 25 illustrates the configurations of electrodes formed on the sheet layers (ninth through fifteenth layers from the bottom) of the ceramic multilayer substrate used in the sixth preferred embodiment of the present invention.
Figure 25:
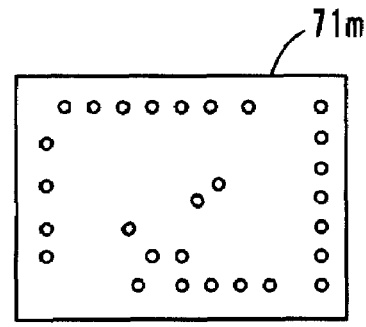
Figure 25:
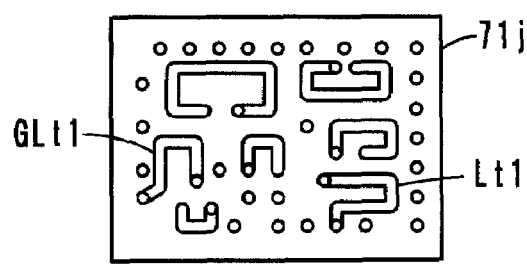
Figure 25:
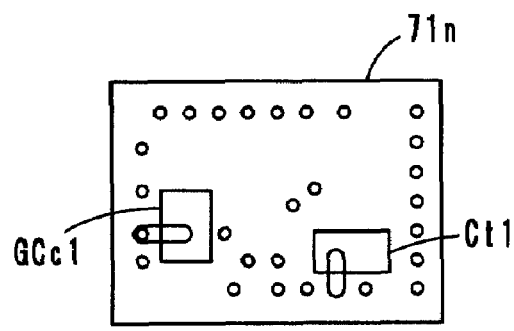
Figure 25:
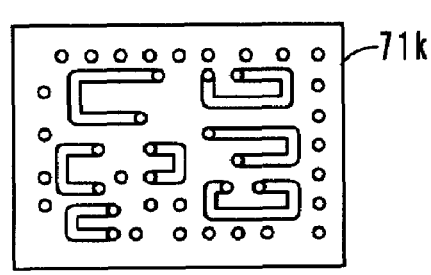
Figure 25:
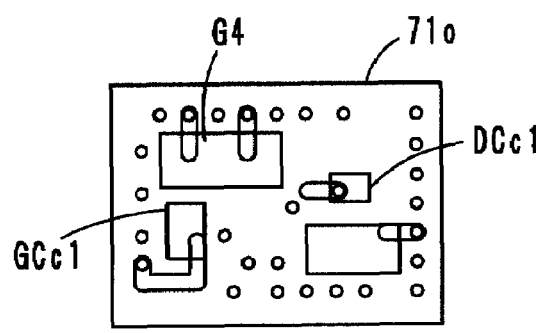
Figure 25:
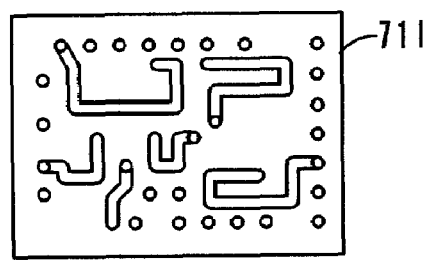
Figure 26:
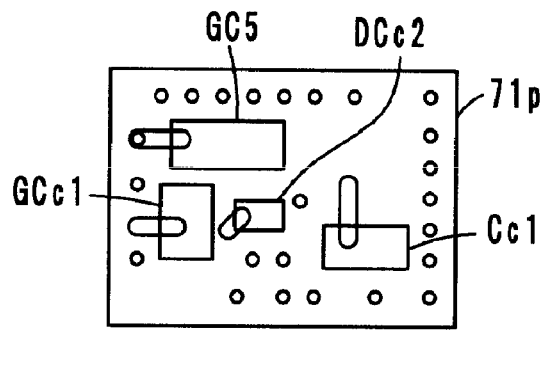
FIG. 26 illustrates the configurations of electrodes formed on the sheet layers (sixteenth through twenty-first layers from the bottom) of the ceramic multilayer substrate used in the sixth preferred embodiment of the present invention.
Figure 26:
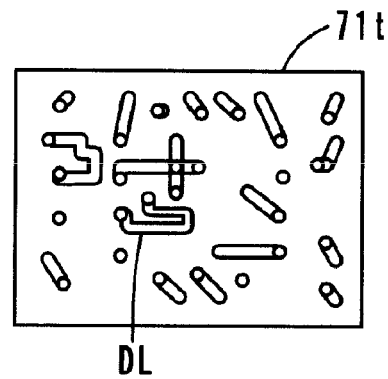
Figure 26:
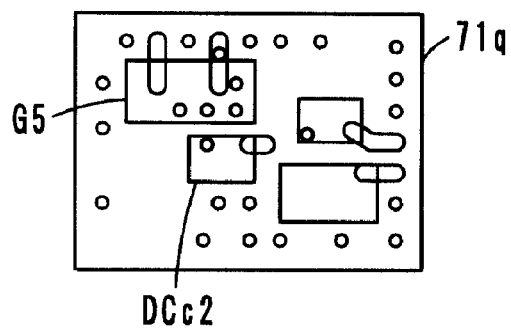
Figure 26:
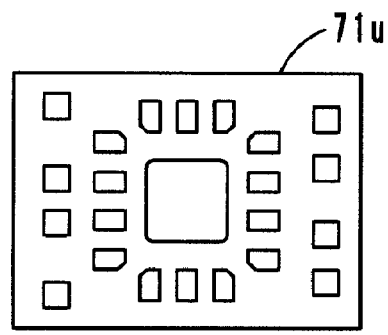
Figure 26:
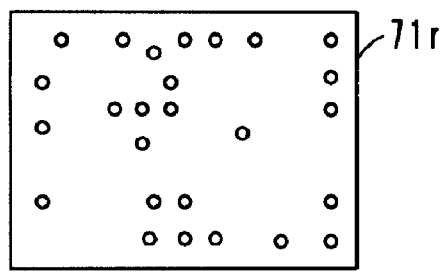
Figure 26:
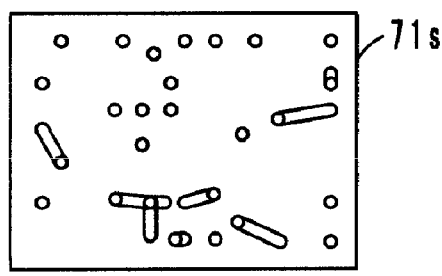

FIGS. 24 through 26 illustrate capacitor electrodes and stripline electrodes preferably constructed by, for example, screen-printing, on sheet layers that form a ceramic multilayer substrate of the high-frequency switching module of the sixth preferred embodiment. The ceramic multilayer substrate is preferably constructed by sequentially laminating first through twenty-first sheet layers 71a through 71u made of ceramics mainly consisting of barium oxide, aluminum oxide, and silica, from the bottom and by firing the laminated sheet layers 71a through 71u at a temperature of about 1,000° C. or lower.

On the first sheet layer 71a, various external connecting terminal electrodes are disposed. On the second sheet layer 71b, the ground electrode G1 is disposed. On the third sheet layer 71c, the electrodes of the capacitors GC5, Ct2, Cu1, and GtxC are provided. On the fourth sheet layer 71d, the ground electrode G2 is disposed. On the fifth sheet layer 71e, the electrodes of the capacitors GC5, GCu1, and DPTxC are disposed, and on the sixth sheet layer 71f, the ground electrode G3 is disposed. On the seventh sheet layer 71g, the electrodes of the capacitors GRxC, DCu1, and DCu2 are provided.

On the ninth sheet layer 71i, the inductors Lt2, DLt1, DLt2, DLt3, and GSL2 are defined by stripline electrodes. On the tenth sheet layer 71j, the inductors GLt1 and Lt1 are defined by stripline electrodes. On the fourteenth sheet layer 71n, the electrodes of the capacitors Ct1 and GCc1 are provided. On the fifteenth sheet layer 71o, the electrodes of the capacitors GCc1 and DCc1 and the ground electrode G4 are disposed.

On the sixteenth sheet layer 71p, the electrodes of the capacitors GCc1, GC5, DCc2, and Cc1 are disposed. On the seventeenth sheet layer 71q, the electrode of the capacitor DCc2 and the ground electrode G5 are disposed. On the twentieth sheet layer 71t, the inductor DL is disposed.

Figure 27:
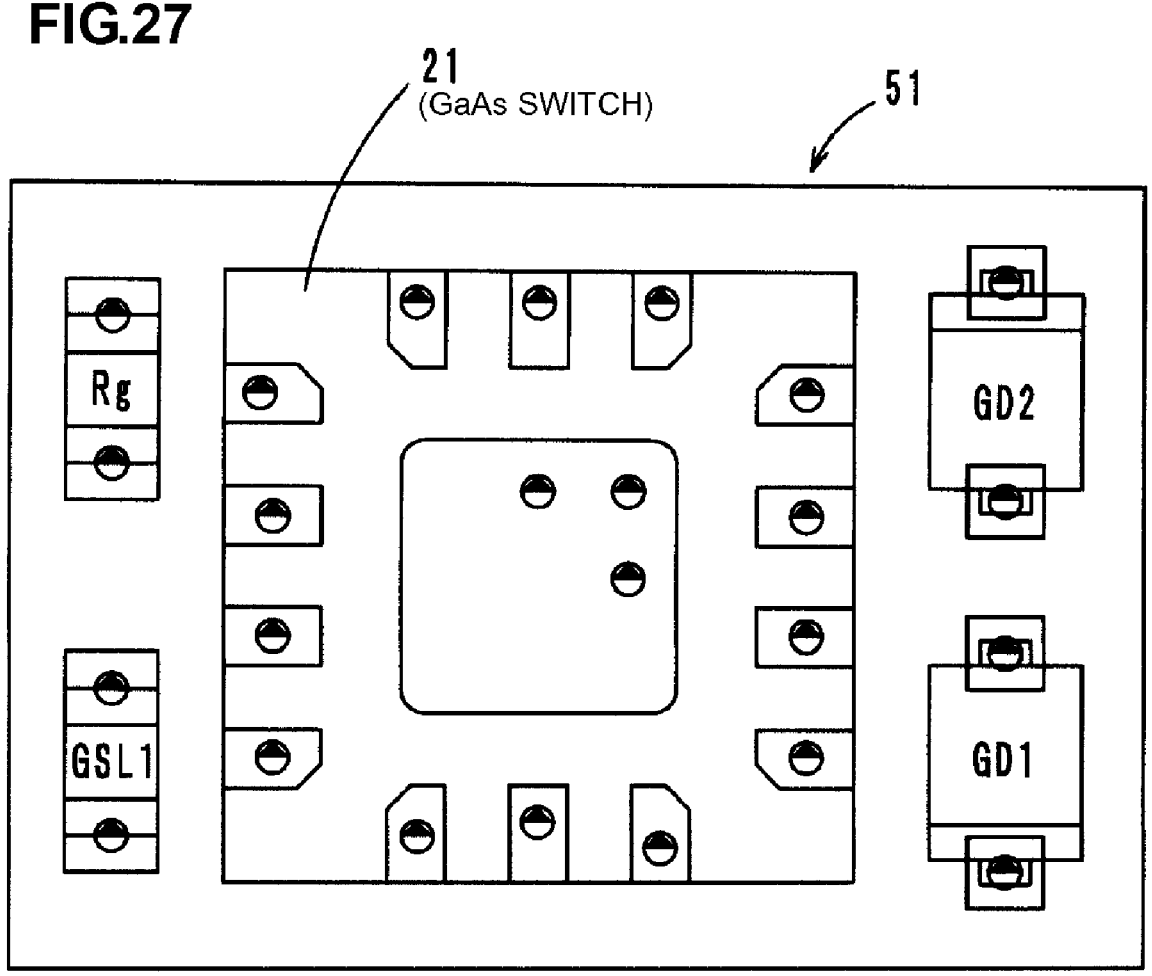
FIG. 27 is a plan view illustrating the state in which circuit devices are mounted on the obverse surface of the ceramic multiplayer substrate used in the sixth preferred embodiment of the present invention.

The obverse surface of the twenty-first sheet layer 71u serves as the obverse surface of a ceramic multilayer substrate 51, as shown in FIG. 27, and various connecting terminal electrodes are disposed thereon. On the obverse surface of the ceramic multiplayer substrate 51, the GaAs switch 21, the resistor Rg, the inductor GSL1, and the diodes GD1 and GD2 are mounted.

The high-frequency switching modules and the frequency-characteristic adjusting methods for high-frequency circuits according to the present invention are not restricted to the above-described preferred embodiments, and various modifications can be made within the spirit of the invention.

As described above, the present invention is effective when being applied to high-frequency switching modules, and, in particular, it is excellent in adjusting the frequency characteristic to a desired frequency characteristic by suppressing the ripple to a small level.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A high-frequency switching module in which a high-frequency switch including a high-frequency switching device arranged to selectively switch between transmission paths for high-frequency signals and a π-type high-frequency filter including inductors and a capacitor arranged to remove unwanted waves generated in the transmission paths are integrated with each other, the high-frequency switching module comprising:
   an inductor connected directly and in series between the π-type high-frequency filter and the high-frequency switching device; and
   a Chebyshev-type low-pass filter including an inductance component and a capacitor component produced when the high-frequency switching device is turned ON and a shunt capacitor provided in the π-type high-frequency filter; wherein
   when a frequency of a ripple, which is a zero point of a pass band, generated by the Chebyshev-type low-pass filter is indicated by fk, the frequency fk is in a frequency band other than n-order higher-harmonic attenuation bands, n being an integral multiple of a fundamental frequency and an integer equal to two or greater.

2. The high-frequency switching module according to claim 1, wherein the frequency fk is positioned between a second higher-harmonic attenuation band and a third higher-harmonic attenuation band.

3. The high-frequency switching module according to claim 1, wherein the high-frequency switch selectively switches the transmission path for transmission signals and the transmission path for reception signals; and
   the π-type high-frequency filter is disposed on the transmission path for the transmission signals to remove high-order higher harmonics of the transmission signals.

4. The high-frequency switching module according to claim 1, wherein the high-frequency switch includes a diode as the high-frequency switching device; and
   the inductor of the π-type high-frequency filter is connected directly and in series to the diode.

5. The high-frequency switching module according to claim 1, wherein the high-frequency switch includes a FET switch as the high-frequency switching device; and the inductor of the π-type high-frequency filter is connected directly and in series to the FET switch.

6. The high-frequency switching module according to claim 1, wherein the π-type high-frequency filter is disposed on the transmission path for high-frequency signals and is a low-pass filter including a first inductor which is connected in parallel to a capacitor and which defines part of an LC parallel resonant circuit and a second inductor which does not have a capacitor connected in parallel to the second inductor and which does not define the LC parallel resonant circuit, and the second inductor which does not define the LC parallel resonant circuit is connected directly and in series to the high-frequency switch.

7. The high-frequency switching module according to claim 1, wherein the inductor of the π-type high-frequency filter has an electric length at least about twice as long as the shortest electric length between one end of the high-frequency switch and another device connected to the one end of the high-frequency switch.

8. The high-frequency switching module according to claim 1, wherein the inductor of the π-type high-frequency filter includes a stripline disposed in a module unit including a plurality of laminated dielectric layers.

9. The high-frequency switching module according to claim 1, wherein the inductor of the π-type high-frequency filter is a chip component disposed in a module unit including a plurality of laminated dielectric layers.

10. The high-frequency switching module according to claim 1, wherein signal transmission paths arranged to transmit high-frequency signals having a single wavelength or for high-frequency signals having a plurality of different wavelengths are selectively switched.

11. A frequency-characteristic adjusting method for a high-frequency circuit including a high-frequency switching device and a shunt capacitor which is shunt-connected at a stage before or after the high-frequency switching device, comprising:

shifting a cut-off frequency of a Chebyshev-type low-pass filter circuit defined by an inductance component and a capacitance component of the capacitor produced when the high-frequency switching device is turned ON and the shunt capacitor to a lower frequency side and suppressing a frequency of a ripple, which is a zero point of a bass band, by adding an inductor directly and in series to the high-frequency switching device; and adjusting a value of the inductance so that, when the frequency of the ripple is indicated by fk, the frequency fk is in a frequency band other than n-order higher-harmonic attenuation bands, n being an integral multiple of a fundamental frequency and an integer equal to two or greater.

12. The frequency-characteristic adjusting method for a high-frequency circuit according to claim 11, wherein the frequency fk is positioned between a second higher-harmonic attenuation band and a third higher-harmonic attenuation band.

13. The frequency-characteristic adjusting method for a high-frequency circuit according to claim 11, wherein the inductor has an electric length at least about twice as long as the shortest electric length between one end of the high-frequency switching device and a device connected to the one end of the high-frequency switching device.

14. The frequency-characteristic adjusting method for a high-frequency circuit according to claim 13, wherein the device is the capacitor which is shunt-connected at a stage before or after the high-frequency switching device.

15. The frequency-characteristic adjusting method for a high-frequency circuit according to claim 11, wherein the high-frequency switching device is a diode, and the inductor is connected directly and in series to the diode.

16. The frequency-characteristic adjusting method for a high-frequency circuit according to claim 11, wherein the high-frequency switching device is a FET switch, and the inductor is connected directly and in series to the FET switch.

* * * * *